United States Patent
Mills

(10) Patent No.: US 10,016,955 B2
(45) Date of Patent: Jul. 10, 2018

(54) PANEL APPARATUS INCLUDING MULTIPLE PANELS AND MECHANICAL FASTENERS AND METHODS OF ASSEMBLING THE PANEL APPARATUS

(71) Applicant: The Boeing Company, Chicago, IL (US)

(72) Inventor: Christopher Mills, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/132,697

(22) Filed: Apr. 19, 2016

(65) Prior Publication Data
US 2017/0297301 A1 Oct. 19, 2017

(51) Int. Cl.
| B32B 7/08 | (2006.01) |
| F16B 5/02 | (2006.01) |
| F16B 5/01 | (2006.01) |
| B32B 3/12 | (2006.01) |
| B32B 3/06 | (2006.01) |
| B32B 37/14 | (2006.01) |
| B32B 38/00 | (2006.01) |
| B64C 1/12 | (2006.01) |

(52) U.S. Cl.
CPC ............. *B32B 7/08* (2013.01); *B32B 3/06* (2013.01); *B32B 3/12* (2013.01); *B32B 37/146* (2013.01); *B32B 38/0012* (2013.01); *F16B 5/01* (2013.01); *B32B 2605/18* (2013.01); *B64C 1/12* (2013.01)

(58) Field of Classification Search
CPC ... B32B 3/06; B32B 3/085; B32B 7/08; F16B 5/01; F16B 5/0024; E04C 2/34; E04C 2/36; E04C 2002/3477
USPC ............................................. 52/783.11, 790.1
See application file for complete search history.

(56) References Cited

U.S. PATENT DOCUMENTS

| 2,257,001 A | * | 9/1941 | Davis | B28B 1/002 |
| | | | | 211/182 |
| 3,129,472 A | * | 4/1964 | Hensel | F16B 12/22 |
| | | | | 29/453 |
| 3,438,659 A | * | 4/1969 | Waldron | E04B 1/49 |
| | | | | 403/280 |
| 3,526,072 A | * | 9/1970 | Campbell | F16L 35/01 |
| | | | | 29/452 |

(Continued)

FOREIGN PATENT DOCUMENTS

| DE | 3410198 A1 | * | 9/1985 | .......... E04B 1/6145 |
| DE | 202014002242 U1 | * | 6/2014 | .............. F16B 12/24 |

*Primary Examiner* — Christine T Cajilig
(74) *Attorney, Agent, or Firm* — McDonnell Boehnen Hulbert & Berghoff LLP

(57) ABSTRACT

A panel apparatus is described that includes a first sandwich panel and a second sandwich panel arranged substantially parallel to each other, and the first sandwich panel and the second sandwich panel each include a core material inserted between at least two skin layers. The panel apparatus also includes at least one mechanical fastener mechanically embedded into the first sandwich panel and the second sandwich panel. The at least one mechanical fastener at least extends through one skin layer and into the core material of the first sandwich panel and at least extends through one skin layer and into the core material of the second sandwich panel, and the at least one mechanical fastener is configured to accept insertion of an item. Methods of assembling the panel apparatus are also described.

27 Claims, 24 Drawing Sheets

(56) References Cited

U.S. PATENT DOCUMENTS

| | | | | |
|---|---|---|---|---|
| 3,579,942 | A * | 5/1971 | Cole | F16L 35/01 |
| | | | | 411/113 |
| 4,335,174 | A | 6/1982 | Belko | |
| 4,667,905 | A * | 5/1987 | Hamm | B64C 3/20 |
| | | | | 244/123.13 |
| 4,757,665 | A * | 7/1988 | Hardigg | B29C 45/26 |
| | | | | 52/782.1 |
| 4,917,747 | A | 4/1990 | Chin et al. | |
| 5,595,123 | A * | 1/1997 | Tao | B61D 17/045 |
| | | | | 105/396 |
| 5,632,126 | A * | 5/1997 | Agsten | E04B 2/8635 |
| | | | | 52/106 |
| 9,079,674 | B1 * | 7/2015 | Grillos | B64G 1/58 |
| 2011/0272078 | A1 * | 11/2011 | Torriani | B29C 63/0026 |
| | | | | 156/73.5 |
| 2015/0223606 | A1 * | 8/2015 | Gerstle | A47C 5/005 |
| | | | | 297/452.1 |
| 2016/0031184 | A1 * | 2/2016 | Lewis | B32B 7/08 |
| | | | | 428/136 |

* cited by examiner

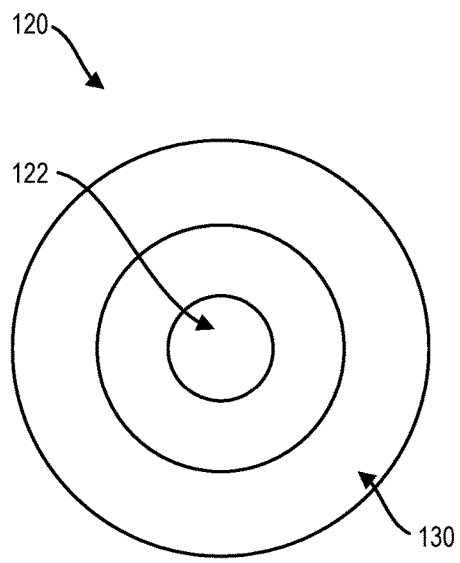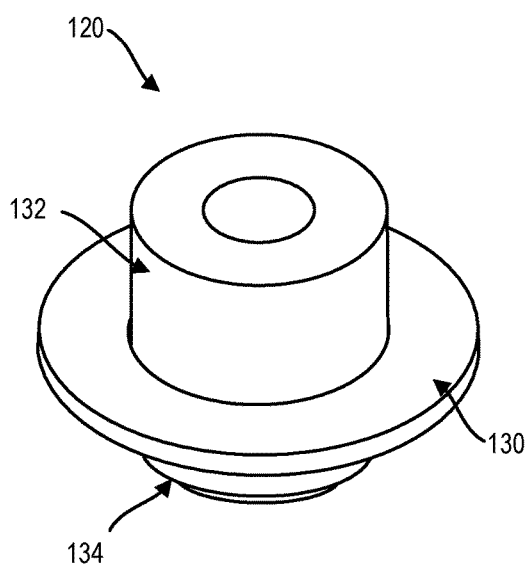
FIG. 6    FIG. 7
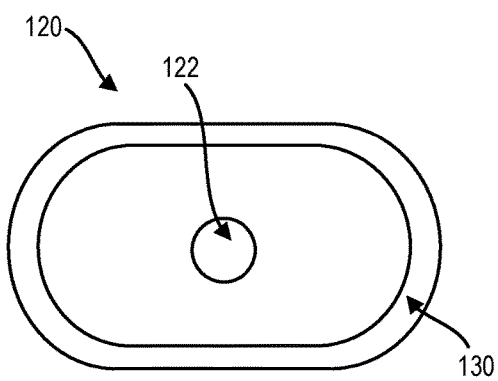
FIG. 8

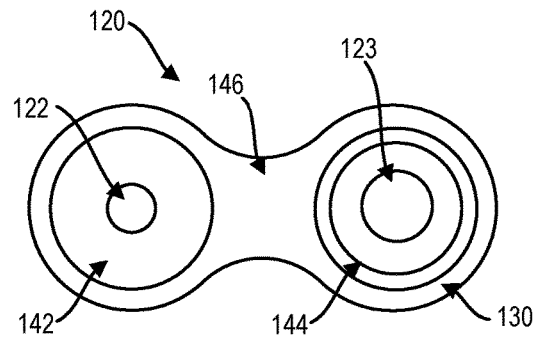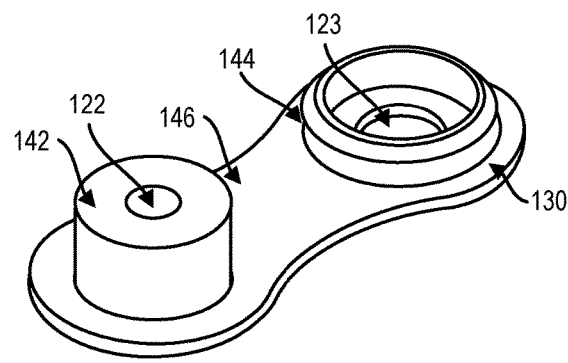
FIG. 23    FIG. 24
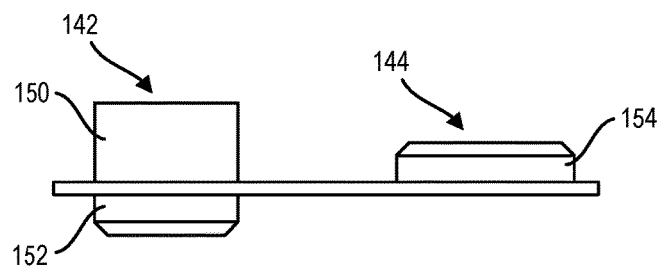
FIG. 25
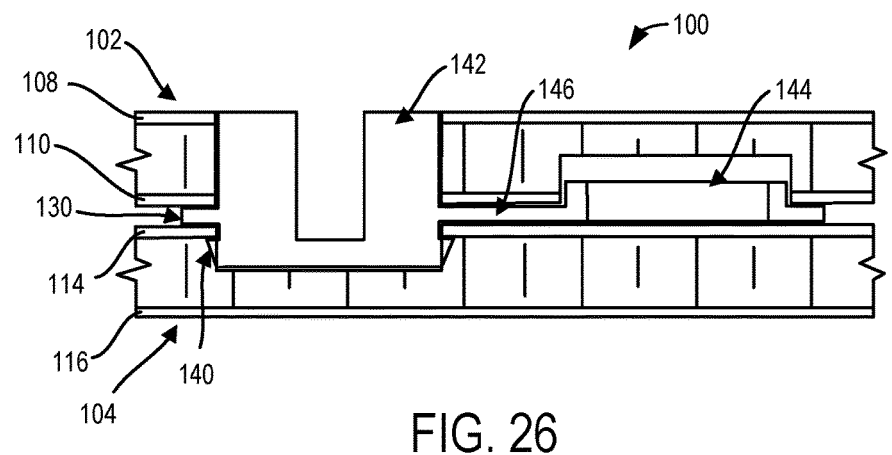
FIG. 26

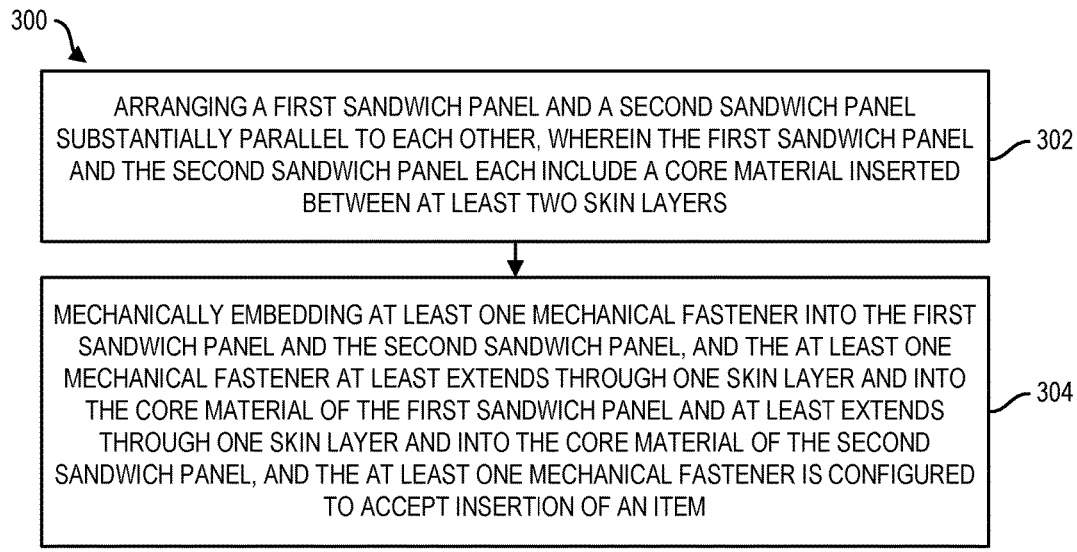
FIG. 84
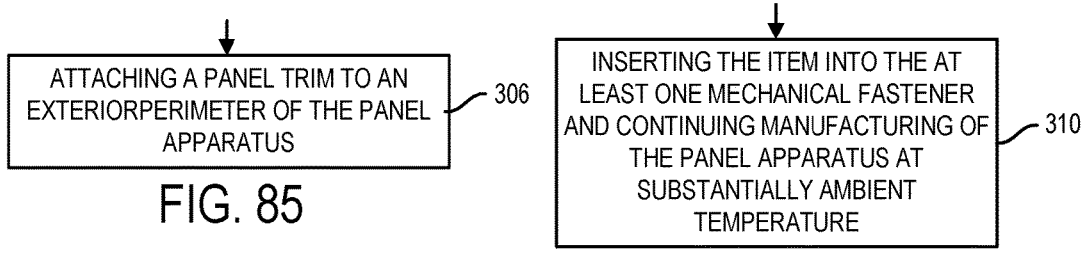
FIG. 85
FIG. 87
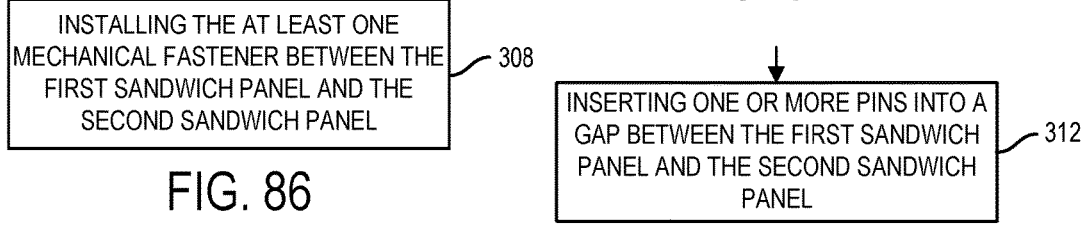
FIG. 86
FIG. 88
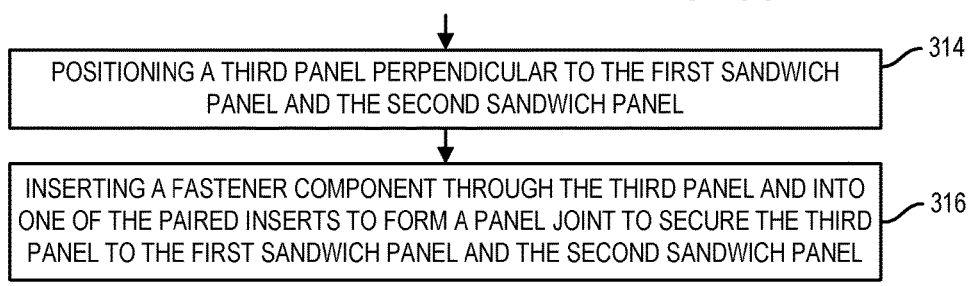
FIG. 89

PANEL APPARATUS INCLUDING MULTIPLE PANELS AND MECHANICAL FASTENERS AND METHODS OF ASSEMBLING THE PANEL APPARATUS

FIELD

The present disclosure generally relates to a panel apparatus including a double panel construction secured by mechanical fasteners, and more particularly to, embedded mechanical fasteners securing a double panel construction and allowing for insertion of an item, for example.

BACKGROUND

In the aircraft industry, sandwich panels of a type having a honeycomb core sandwiched between two outer skins are widely used. One such type of panel is a crushed core sandwich panel in which the core and skins are compressed and portions cured following their assembly. A "crushed core" process can be used for contoured panels and may or may not fully or partially crush the honeycomb core of the panel. Flat panels typically do not use the "crushed core" process, but rather can be made either by placing panel components in layers on a flat plate and then vacuum bagging the assembly and curing under heat and pressure, or by using a pair of plates that hold the flat panel together under some pressure and temperature while the panels cure. Typically, panel skins contain a resin that flows when the temperature is raised and adhere the panel components together.

During manufacturing of contoured or flat panels, heat is applied to cure the panel components, and the skins are bonded to the core and have smooth outer surfaces in the finished panel. When these panels are used in areas visible to airplane passengers, the finished appearance of the panel is important. Therefore, it is desirable to provide the finished panels with a decorative coating or covering to enhance their aesthetic appearance. When the core of the panel is a material such as honeycomb, the covered or coated edges of the panel have a rough uneven appearance if the honeycomb extends all the way to the edges. To avoid this uneven appearance, the edge portions of the core of the panels are formed by a relatively homogeneous material instead of honeycomb. Foam can also be used to increase strength on the panel edges.

Sandwich panels are used extensively in aircraft component construction due to their high strength to weight ratios. Typically, depending on use of the panel, additional components and inserts are used to secure sandwich panels to other sandwich panels, and also to attach other components to sandwich panels. An insert is a component that typically is installed into a hole feature cut into the sandwich panel and is held in place using an adhesive referred to as a "potting compound". Inserts typically accept threaded items although a variety of engagement features exist, such as keyhole slots, undercuts, etc. Thus, sandwich panel inserts that utilize a potting compound (i.e., an adhesive) to bond the insert to sandwich panels require time to cure, during which no work can be performed on the inserts. Potting compound and insert are usually allowed to cure between 2 to 4 hours to reach sufficient strength to allow installation of features into the inserts.

Sandwich panel inserts may not hold their position well on a sandwich panel while curing or when subjected to accelerated cure processes. Forces due to potting compound expansion can shift an insert position during the cure process. Inserts that are shifted from their nominal location can result in aesthetic mark-off. At times, to maintain position of the insert during cure, masking tape is used to prevent mark-off. Furthermore, in instances in which inserts are installed into both sides of the panel, more time and effort is required to maintain positions of the inserts during cure.

In instances in which two panels are joined together, sometimes bonded panel joints are used. Multiple bonded joints for a larger assembly are typically completed at the same time, and then are clamped and held until curing has completed. This limits the ability to work on the panel apparatus until the curing is complete.

Using potting compounds and bonding of panel joints thus adds to the cost of assemblies through material costs as well as cycle times associated with curing.

SUMMARY

In one example, a panel apparatus is described that comprises a first sandwich panel and a second sandwich panel arranged substantially parallel to each other, and the first sandwich panel and the second sandwich panel each include a core material inserted between at least two skin layers. The panel apparatus also comprises at least one mechanical fastener mechanically embedded into the first sandwich panel and the second sandwich panel, and the at least one mechanical fastener at least extends through one skin layer and into the core material of the first sandwich panel and at least extends through one skin layer and into the core material of the second sandwich panel. The at least one mechanical fastener is configured to accept insertion of an item.

In another example, a method of assembling a panel apparatus is described that comprises arranging a first sandwich panel and a second sandwich panel substantially parallel to each other, and the first sandwich panel and the second sandwich panel each include a core material inserted between at least two skin layers. The method also comprises mechanically embedding at least one mechanical fastener into the first sandwich panel and the second sandwich panel, and the at least one mechanical fastener at least extends through one skin layer and into the core material of the first sandwich panel and at least extends through one skin layer and into the core material of the second sandwich panel. The at least one mechanical fastener is configured to accept insertion of an item.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 6 illustrates a top view of an example of the mechanical fastener, according to an example embodiment.

FIG. 7 illustrates an isometric view of an example of the mechanical fastener, according to an example embodiment.

FIG. 8 illustrates a top view of another example of the mechanical fastener, according to an example embodiment.

FIG. 23 illustrates a top view of another example of the mechanical fastener, according to an example embodiment.

FIG. 24 illustrates a three-dimensional view of the mechanical fastener of FIG. 23, according to an example embodiment.

FIG. 25 illustrates a side view of the mechanical fastener of FIG. 23, according to an example embodiment.

FIG. 26 illustrates an example of the mechanical fastener of FIG. 23 embedded into the first sandwich panel and the second sandwich panel, according to an example embodiment.

FIG. 84 shows a flowchart of an example method of assembling the panel apparatus, according to an example embodiment.

FIG. 85 shows a flowchart of an example method for use with the method shown in FIG. 84, according to an example embodiment.

FIG. 86 shows a flowchart of another example method for use with the method shown in FIG. 84, according to an example embodiment.

FIG. 87 shows a flowchart of another example method for use with the method shown in FIG. 84, according to an example embodiment.

FIG. 88 shows a flowchart of another example method for use with the method shown in FIG. 84, according to an example embodiment.

FIG. 89 shows a flowchart of another example method for use with the method shown in FIG. 84, according to an example embodiment.

DETAILED DESCRIPTION

Figure 1:
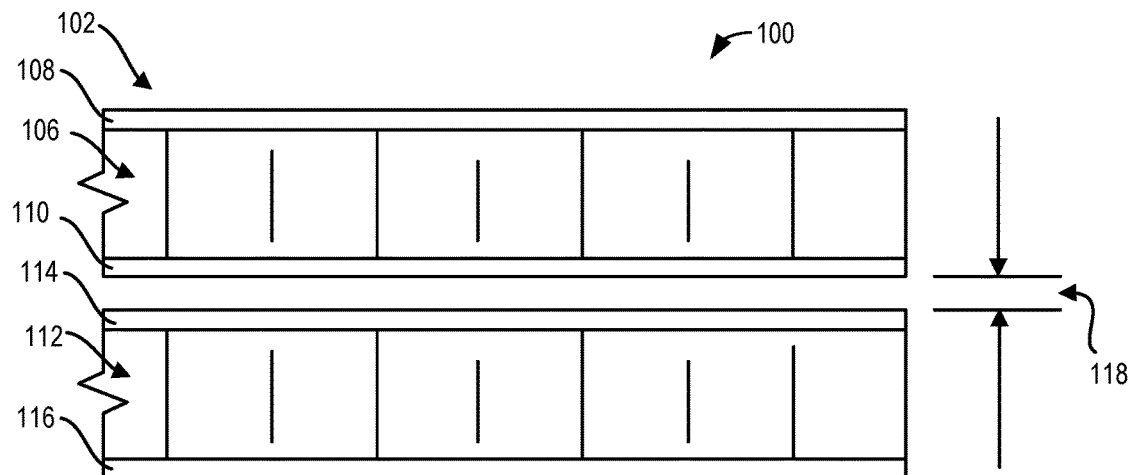
FIG. 1 illustrates an example panel apparatus that has a double panel construction, according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples, a panel assembly is described that includes sandwich panels coupled or connected to each other using one or more mechanical fasteners that do not require use of adhesives and/or potting compounds. The panel assembly uses a quantity of two sandwich panels where typically one sandwich panel is used. By using two panels separated by a space or gap, various mechanical fasteners are installed that remove typical disadvantages of a current state of the art.

An example panel assembly removes the need to use a potting compound (i.e., an epoxy glue) to secure inserts into the panels for attachment of the panel to various items. By removing the need for potting compounds, a cycle time and cost are reduced. Rather than using adhesives, the example panel assembly utilizes two substantially parallel panels, rather than one panel, to mechanically secure mechanical fasteners between the two panels. Inserts that previously required a potting compound can be mechanically retained using the double panel construction. Example mechanical fasteners that may be mechanically attached to the panel system include barrel nuts, flanged inserts, edge inserts, panel trims, wiring mounting saddles, sandwich panel spacers, load transferring pins, and others.

Additionally, cycle times and costs can be reduced if mechanical fasteners are sufficiently retained even though potting compounds may be used. Sufficiently retaining the mechanical fasteners includes retaining them such that an item can be installed into the mechanical fasteners immediately (or substantially immediately) after being installed even though a strength of the mechanical fasteners may not yet be the full strength of what it will be when the potting is fully cured. For example, using methods described herein, a mechanical fastener that supports an attach bracket can be installed with adhesive, and then the bracket can immediately be installed to the mechanical fastener even though the adhesive has not cured due to the panel assembly construction. With the example methods described herein, the strength of that mechanical fastener may only be 50% of what its full strength will be once the adhesive is fully cured. Since the bracket will not be fully loaded until the whole assembly is installed on to the airplane and the time it takes for the whole assembly to be completed and installed on to the airplane is longer than the cure time of the adhesive, this will reduce the cure time cycle time as compared to existing methods that require an insert to be fully cured before attaching any items.

Referring now to FIG. 1, a panel apparatus 100 that has a double panel construction is shown. A first sandwich panel 102 and a second sandwich panel 104 are arranged substantially parallel to each other. As used herein, by the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide. For example, the first sandwich panel 102 and the second sandwich panel 104 may be arranged parallel to each other or substantially parallel in which there is some minor offset angle between the first sandwich panel 102 and the second sandwich panel 104.

The first sandwich panel 102 includes a core material 106 inserted between at least two skin layers 108 and 110. Similarly, the second sandwich panel 104 includes a core material 112 inserted between at least two skin layers 114 and 116. The first sandwich panel 102 and the second sandwich panel 104 may include a low density core inserted in between two relatively thin skin layers. The sandich setup allows for high mechanical performance at minimal weight. A high rigidity of a sandwich panel is achieved due to interaction of its components under flexural and various loads applied to the panel.

Within examples, the core material 106 and 112 may include a foam section. An example of a material for the core includes Divinycell foam, which is an alloy linear vinyl polymer crosslinked with a urea-amide polymer. In other examples, the first sandwich 102 and the second sandwich panel 104 include honeycomb core. An example of a honeycomb core material is Nomex honeycomb. The skin layers 108 and 110, and 114 and 116, may be formed by one or more plies of graphite/phenolic prepreg fabric or tape. A decorative covering or coating can be applied to the skin layers, and may include a polyvinylfluoride film, such as Tedlar film.

Figure 2:
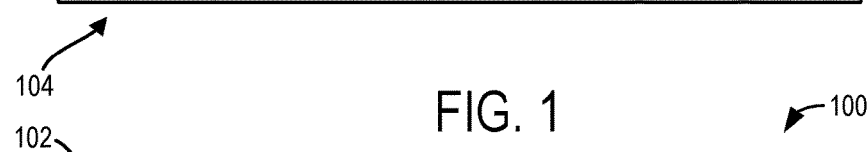
FIG. 2 illustrates another example panel apparatus with different thickness panels, according to an example embodiment.

As shown in FIG. 1, the first sandwich panel 102 and the second sandwich panel 104 can be arranged to include a gap 118 between the panels. The gap 118 may be narrow or wide relative to an overall panel thickness. In addition, although FIG. 1 shows the first sandwich panel 102 and the second sandwich panel 104 to be the same thickness, the first sandwich panel 102 and the second sandwich panel 104 may be different thicknesses, such as shown in FIG. 2, for example. Example thicknesses include ⅛ inch, ¼ inch, ½ inch, 1 inch, 1.5 inch, etc. depending on use. In addition, the first sandwich panel 102 and the second sandwich panel 104 may be flat or curved designs.

Further, although FIGS. 1-2 show that the first sandwich panel 102 and the second sandwich panel 104 each include two skin layers 108, 110 and 114, 116, respectively, additional skin layers may be used. The first sandwich panel 102 and the second sandwich panel 104 can be balanced using the same number of skin layers on either side, as shown in FIG. 1, or the first sandwich panel 102 and the second sandwich panel 104 may be unbalanced such as using two plies on outer faces and one ply on an inner face, for example.

The first sandwich panel 102 and the second sandwich panel 104 apparatus shown in FIGS. 1-2 is a lightweight, strong, and high quality aerospace structure that can be used in many interior applications.

Figure 3:
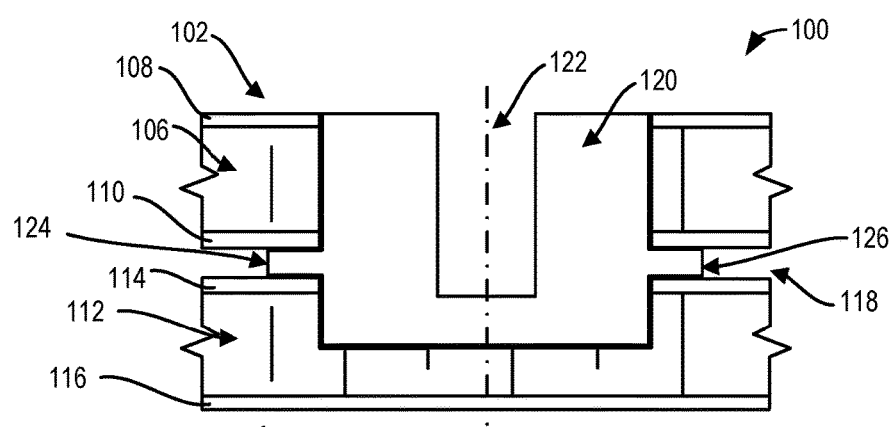
FIG. 3 illustrates a cross-sectional view of the panel apparatus including the double panel construction with at least one mechanical fastener mechanically embedded into the first sandwich panel and the second sandwich panel, according to an example embodiment.

FIG. 3 illustrates a cross-sectional view of the panel apparatus 100 including the double panel construction with at least one mechanical fastener 120 mechanically embedded into the first sandwich panel 102 and the second sandwich panel 104. The mechanical fastener 120 at least extends through one skin layer (either 108, 110, or both skin layers 108 and 110) and into the core material 106 of the first sandwich panel 102, and at least extends through one skin layer (either 114, 116, or both skin layers 114 and 116) and into the core material 112 of the second sandwich panel 104. In the example shown in FIG. 3, the mechanical fastener 120 extends through both skins layers 108 and 110 and through the core material 106 of the first sandwich panel 102 and through the skin layer 114 and into the core material 112 of the second sandwich panel 104.

The mechanical fastener 120 is configured to accept insertion of an item into an opening 122. Many types of items may be inserted, depending on an application of the panel apparatus 100, and can also include latches, hinges, or attachment mechanisms for attaching an external component to the panel apparatus 100.

The mechanical fastener 120 may comprise plastic, rubber, metal, or other composite materials as well.

The mechanical fastener 120 is mechanically secured between the first sandwich panel 102 and the second sandwich panel 104 without use of an adhesive. As shown, a hole may be cut out of the first sandwich panel 102 and the second sandwich panel 104, and the mechanical fastener 120 can be inserted or forced into the hole for a secured fitting. The mechanical fastener 120 secures the first sandwich panel 102 and the second sandwich panel 104 to each other such that the gap 118 remains between the first sandwich panel 102 and the second sandwich panel 104. The mechanical fastener 120 can further include flanges 124 and 126, discussed more fully below that are positioned in the gap 118 to maintain spacing between the first sandwich panel 102 and the second sandwich panel 104 and to help secure the mechanical fastener 120 within the panel apparatus 100. The mechanical fastener 120 may include the multiple flanges 124 and 126, or a single uniform flange that surrounds a perimeter of the mechanical fastener 120.

Within examples described herein, the mechanical fastener 120 is an insert into the panel assembly 100. The mechanical fastener 120 can be of many forms, as described within the examples below, such as a one-sided insert, a double-sided insert, a smooth sleeve, etc. The mechanical fastener 120 thus functions as an insert to accept insertion of an item. In addition, within other examples described herein, the mechanical fastener 120 functions as a connector, or interconnector, and thus is considered an interconnector between the first sandwich panel 102 and the second sandwich panel 104. In such examples, the mechanical fastener 120, can be any one of various examples as described herein including a pin or other structural components, and a purpose of the mechanical fastener 120 in some examples may be solely to provide a structural connection between the first sandwich panel 102 and the second sandwich panel 104. Furthermore, in some examples, the mechanical fastener 120 functions as both an insert and a connector, and thus, has purposes such as to accept an item or provide a passageway as well as to provide a structural connection between the first sandwich panel 102 and the second sandwich panel 104.

Figure 4:
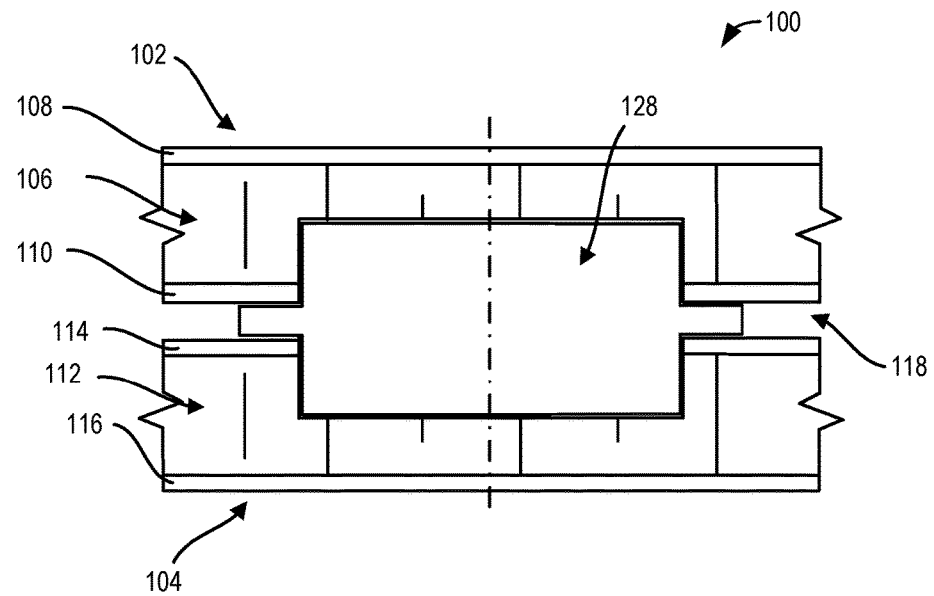
FIG. 4 illustrates an example of the panel apparatus including a shear pin, according to an example embodiment.
Figure 5:
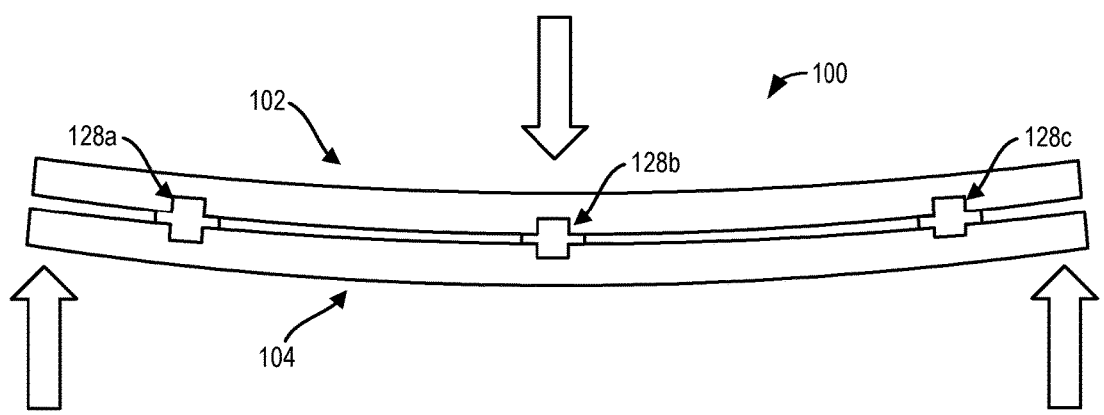
FIG. 5 illustrates an example in which the panel apparatus undergoes a bending force, according to an example embodiment.

FIG. 4 illustrates an example of the panel apparatus 100 including a shear pin 128. For example, one or more pins 128 may be inserted into the gap 118 between the first sandwich panel 102 and the second sandwich panel 104. The pin 128 extends through a bottom skin layer 110 of the two skin layers of the first sandwich panel 102 and into the core material 106 of the first sandwich panel 102 and also extends through a top skin layer 114 of the two skin layers of the second sandwich panel 104 and into the core material 112 of the second sandwich panel 104. The first sandwich panel 102 and the second sandwich panel 104 are arranged such that the bottom skin layer 110 of the first sandwich panel 102 faces the top skin layer 114 of the second sandwich panel 104. FIG. 5 illustrates an example of the panel apparatus 100 including shear pins 128a-c. The shear pins 128a-c transfer load such that a strength of the first sandwich panel 102 and the second sandwich panel 104 is increased and the two panels act as one panel structurally.

FIG. 5 illustrates an example in which the panel apparatus 100 undergoes a bending force, and the pins 128a-c cause the first sandwich panel 102 and the second sandwich panel 104 to act as one panel. The shear pins 128a-c connect the first sandwich panel 102 and the second sandwich panel 104, and positioning, spacing, and a number of shear pins to use depends on application and load required. Having multiple shear pins 128a-c increases a strength of the panel apparatus 100 since the first sandwich panel 102 and the second sandwich panel 104 are working as a unitary member rather than acting independently. This allows for a lighter weight, space efficient, stronger, and easier to manufacture panel assembly 100.

FIG. 6 illustrates a top view of an example of the mechanical fastener 120, and FIG. 7 illustrates a side view of the mechanical fastener 120. In this example, the mechanical fastener 120 includes a flange 130 that extends around a perimeter of the mechanical fastener 120. FIG. 8 illustrates a top view of an example of the mechanical fastener 120, in which the mechanical fastener 120 is non-circular. Many variations of shapes may be used, such as non-round mechanical fasteners to resist torque forces and associated movements.

FIGS. 9-14 illustrate various examples of the mechanical fastener 120 embedded into the first sandwich panel 102, and/or also embedded into the second sandwich panel 104.

Figure 9:
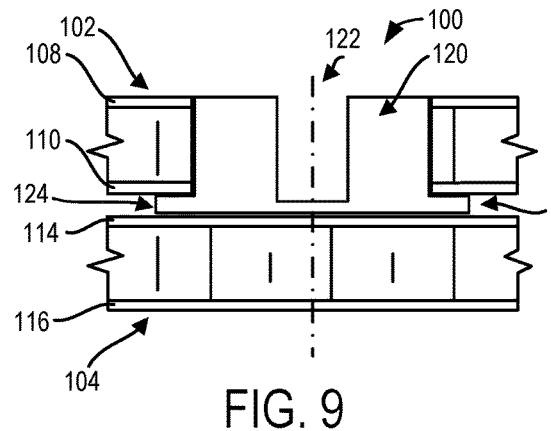
FIG. 9 illustrates a cross-sectional view of an example of the mechanical fastener embedded into and through the first sandwich panel, and a flange abuts the skin layer of the second sandwich panel, according to an example embodiment.

FIG. 9 illustrates a cross-sectional view of the mechanical fastener 120 embedded into and through the first sandwich panel 102, and the flange 124 abuts the skin layer 114 of the second sandwich panel 104. In this example, the mechanical fastener 120 only extends into the first sandwich panel 102 to enable attachment of an item to the panel apparatus 100.

Figure 10:
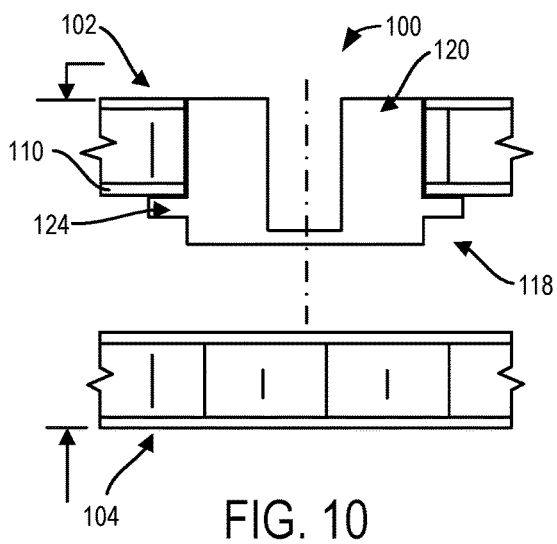
FIG. 10 illustrates a cross-sectional view of an example of the mechanical fastener embedded into and through the first sandwich panel, according to an example embodiment.

FIG. 10 illustrates a cross-sectional view of the mechanical fastener 120 embedded into and through the first sandwich panel 102. In this example, the gap 118 is wide and the mechanical fastener 120 does not extend into the second sandwich panel 104. The flange 124 abuts the skin layer 110 of the first sandwich panel 102. Different arrangements of the mechanical fastener 120 may be used for different functions. In FIG. 10, the mechanical fastener 120 creates an opening for an item to attach to the first sandwich panel 102.

Figure 11:
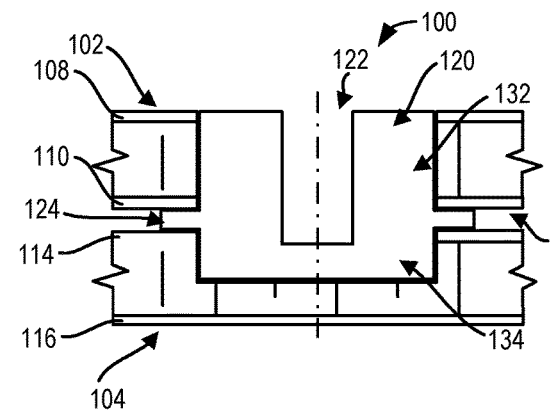
FIG. 11 illustrates a cross-sectional view of an example of the mechanical fastener embedded into and extends through the first sandwich panel and at least extends through one skin layer and into the core material of the second sandwich panel, according to an example embodiment.

FIG. 11 illustrates a cross-sectional view of the mechanical fastener 120 embedded into and extends through the first sandwich panel 102 and at least extends through one skin layer 114 and into the core material of the second sandwich panel 104. The mechanical fastener 120 includes the top portion 132 mechanically embedded into the first sandwich panel 102, the bottom portion 134 mechanically embedded into the second sandwich panel 104, and the flange 124 around a perimeter of the mechanical fastener 120 between the top portion 132 and the bottom portion 134. The flange 124 inserts between a bottom skin layer 110 of the first sandwich panel 102 and a top skin layer 114 of the second sandwich panel 104. The first sandwich panel 102 and the second sandwich panel 104 are arranged such that the bottom skin layer 110 of the first sandwich panel 102 faces the top skin layer 114 of the second sandwich panel 104.

Figure 12:
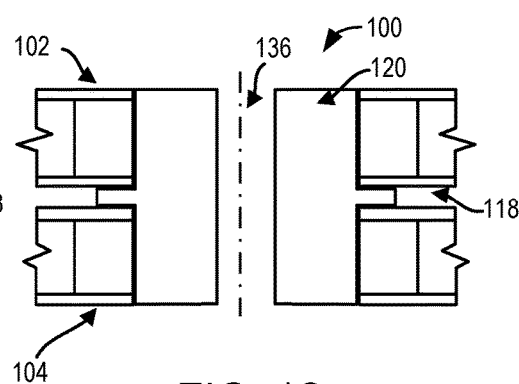
FIG. 12 illustrates a cross-sectional view of an example of the mechanical fastener embedded into and extending through both the first sandwich panel and the second sandwich panel, according to an example embodiment.

FIG. 12 illustrates a cross-sectional view of the mechanical fastener 120 embedded into and extending through both the first sandwich panel 102 and the second sandwich panel 104. In this instance, the mechanical fastener 120 provides a passageway 136 through the panel apparatus 100.

Figure 13:
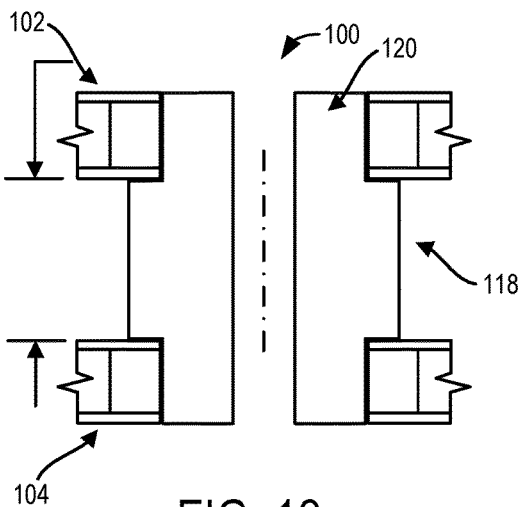
FIG. 13 illustrates a cross-sectional view of an example of the mechanical fastener embedded into and extending through both the first sandwich panel and the second sandwich panel, according to an example embodiment.

FIG. 13 illustrates a cross-sectional view of the mechanical fastener 120 embedded into and extending through both the first sandwich panel 102 and the second sandwich panel 104, in which the gap 118 is shown as a wide gap. In this example, the mechanical fastener 120 transfers load through both the first sandwich panel 102 and the second sandwich panel 104, as well as maintains positioning between the first sandwich panel 102 and the second sandwich panel 104. To maintain positioning between the first sandwich panel 102 and the second sandwich panel, the gap 118 is maintained.

Figure 14:
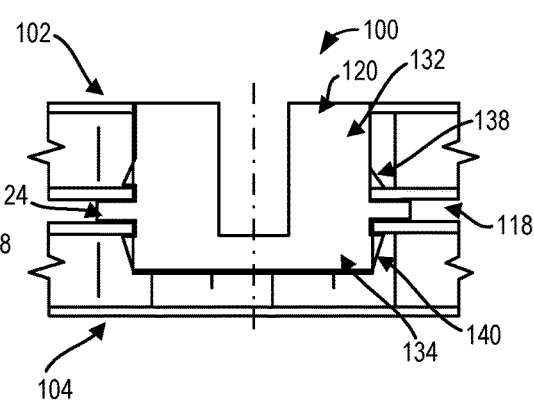
FIG. 14 illustrates a cross-sectional view of an example of the mechanical fastener embedded into and extending through the first sandwich panel and embedded into the second sandwich panel, according to an example embodiment.

FIG. 14 illustrates a cross-sectional view of the mechanical fastener 120 embedded into and extending through the first sandwich panel 102 and embedded into the second sandwich panel 104, similar to the arrangement shown in FIG. 11. In this example though, the mechanical fastener 120 includes engagement features 138 and 140 to maintain spacing between the first sandwich panel 102 and the second sandwich panel 104, and to maintain the mechanical fastener 120 within each of the first sandwich panel 102 and the second sandwich panel 104. To maintain positioning and spacing between the first sandwich panel 102 and the second sandwich panel, the gap 118 is maintained. The flange 124 prevents the gap 118 from decreasing and the engagement features 138 and 140 prevent the gap 118 from increasing.

The engagement features 138 and 140 are protrusions on the top portion 132 of the mechanical fastener 120 that extend into the core material of the first sandwich panel 102 and on the bottom portion 140 of the mechanical fastener 120 that extend into the core material of the second sandwich panel 104. The engagement features 138 and 140 may extend around a perimeter of the mechanical fastener 120, or may be provided at one position on the mechanical fastener 120. The engagement features 138 and 140 engage with the skin layers 110 and 114, for example.

Figure 15:
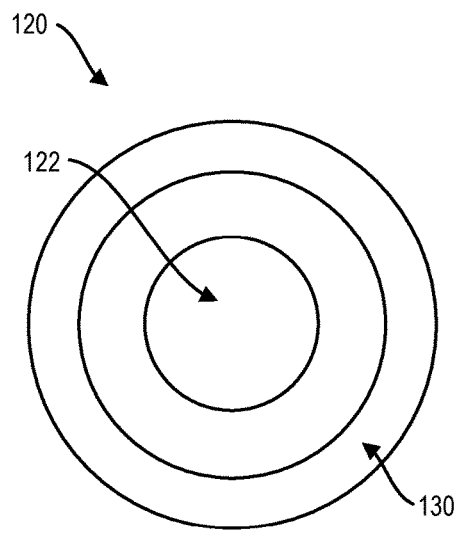
FIG. 15 illustrates a top view of another example of the mechanical fastener, according to an example embodiment.
Figure 16:
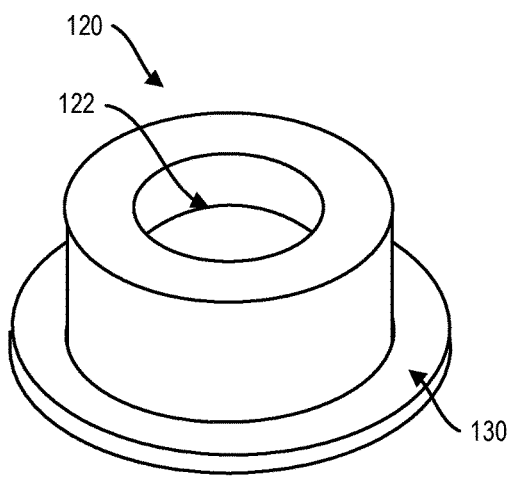
FIG. 16 illustrates a side view of the mechanical fastener of FIG. 15, according to an example embodiment.
Figure 17:
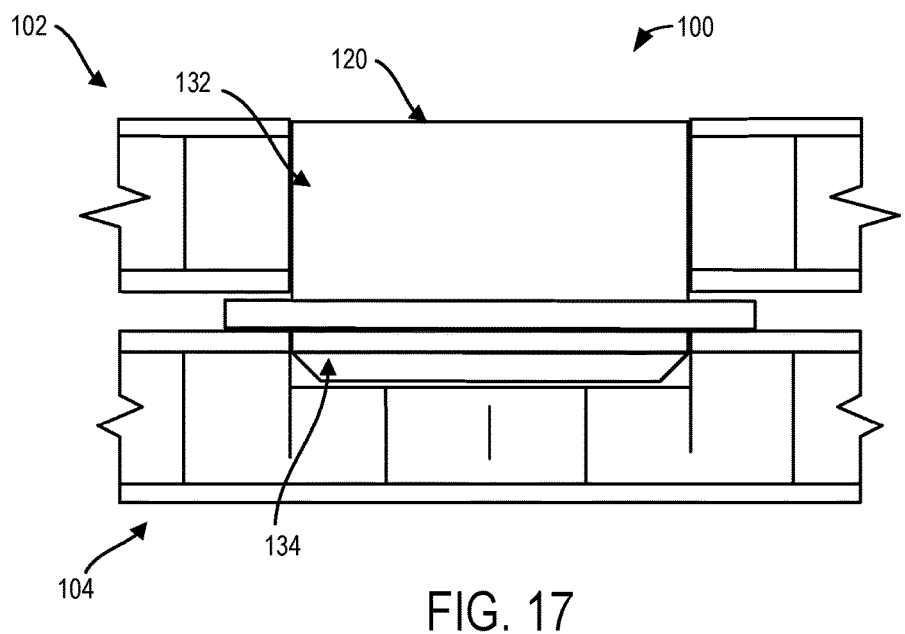
FIG. 17 illustrates a side view of an example of the mechanical fastener of FIG. 15 embedded into the first sandwich panel and the second sandwich panel.

FIG. 15 illustrates a top view of another example of the mechanical fastener 120, and FIG. 16 illustrates a side view of this example of the mechanical fastener 120. In this example, the mechanical fastener 120 includes the flange 130 that extends around a perimeter of the mechanical fastener 120; however the bottom portion 134 of the mechanical fastener 120 is shorter, and extends less into the second sandwich panel 104. FIG. 17 illustrates a side view of an example of the mechanical fastener 120 embedded into the first sandwich panel 102 and the second sandwich panel 104.

Figures 18, 19:
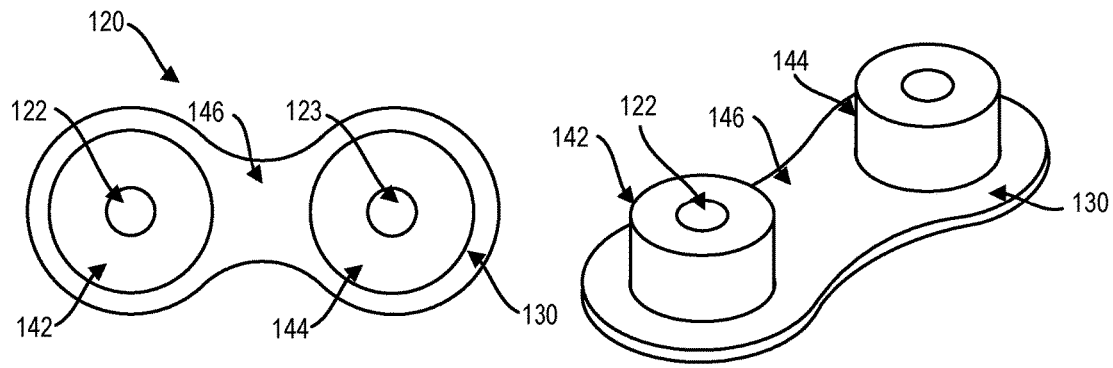
FIG. 18 illustrates a top view of another example of the mechanical fastener, according to an example embodiment.
FIG. 19 illustrates a three-dimensional view of the mechanical fastener of FIG. 18, according to an example embodiment.

FIG. 18 illustrates a top view of another example of the mechanical fastener 120, and FIG. 19 illustrates a three-dimensional view of this example of the mechanical fastener 120. In this example, the mechanical fastener 120 includes paired inserts 142 and 144 connected by an arm 146. Each insert 142 and 144 includes an opening 122 and 123 into which an item may be inserted. The mechanical fastener 120 is shown to include the flange 130 around a perimeter of both of the paired inserts 142 and 144. Pairing of the inserts 142 and 144 helps to resist torque loads.

Figure 20:
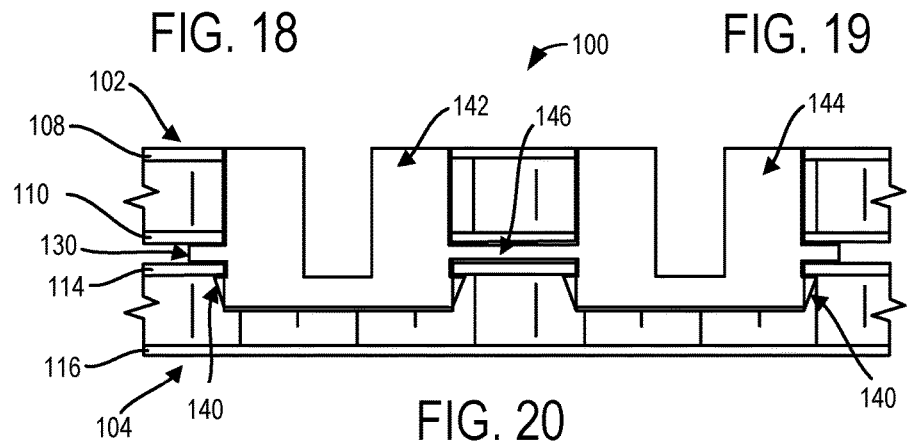
FIG. 20 shows a cross-sectional view of the panel apparatus, in which inserts of the mechanical fastener at least extends through the one skin layer and into the core material of the first sandwich panel and at least extends through the one skin layer and into the core material of the second sandwich panel, according to an example embodiment.
Figure 21:
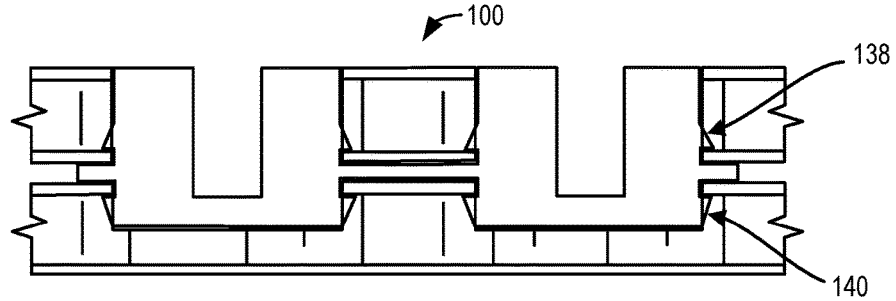
FIG. 21 shows a cross-sectional view of the panel apparatus, in which the mechanical fastener includes engagement features on both top and bottom portions, according to an example embodiment.
Figure 22:
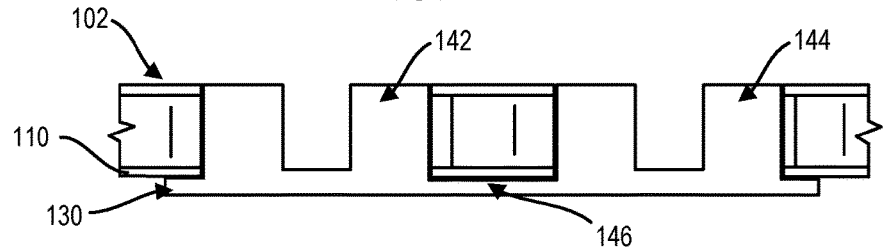
FIG. 22 shows a cross-sectional view of the panel apparatus, in which only the first sandwich panel is shown, according to an example embodiment.

FIGS. 20-22 illustrates examples of the mechanical fastener 120 with paired inserts 142 and 144 embedded into the first sandwich panel 102 and the second sandwich panel 104. FIG. 20 shows a cross-sectional view of the panel apparatus 100, in which each insert of the paired inserts 142 and 144 at least extends through the one skin layer 110 and into the core material of the first sandwich panel 102 and at least extends through the one skin layer 114 and into the core material of the second sandwich panel 104. At least one of the inserts of the paired inserts 142 and 144 is configured to accept insertion of the item. In FIG. 20, the mechanical fastener 120 is shown with the bottom engagement features 140.

FIG. 21 shows a cross-sectional view of the panel apparatus 100, in which the mechanical fastener includes engagement features 138 and 140 on both top and bottom portions.

FIG. 22 shows a cross-sectional view of the panel apparatus 100, in which only the first sandwich panel 102 is shown. In this example, the mechanical fastener 120 only extends through the first sandwich panel 102, and the flange 130 abuts the skin layer 110 of the first sandwich panel.

FIG. 23 illustrates a top view of another example of the mechanical fastener 120, FIG. 24 illustrates a three-dimensional view of this example of the mechanical fastener 120, and FIG. 25 illustrates a side view of this example of the mechanical fastener 120. In this example, the mechanical fastener 120 includes the inserts 142 and 144 connected by the arm 146. Each insert 142 and 144 includes an opening 122 and 123 into which an item may be inserted. The mechanical fastener 120 is shown to include the flange 130 around a perimeter of both of the paired inserts 142 and 144. The insert 142 includes both a top portion 150 and a bottom portion 152, but the insert 144, however, only includes a top portion 154. FIGS. 23-25 thus illustrate the mechanical fastener 120 with the insert 142 and the insert 144 may be an anti-rotation or torque load resisting feature. This configuration may be useful for a non-round (such as an oblong hole) that requires a cutter to plunge into a panel and then move along a desired path to make the oblong feature. A drill typically cuts on its bottom face whereas a cutter cuts primarily on its side faces, and two drilled round holes may be less expensive to manufacture than a feature made with a cutter.

FIG. 26 illustrates an example of the mechanical fastener 120 with the inserts 142 and 144 embedded into the first sandwich panel 102 and the second sandwich panel 104. In this example, the insert 142 at least extends through the one skin layer 110 and into the core material of the first sandwich panel 102 and at least extends through the one skin layer 114 and into the core material of the second sandwich panel 104, and the insert 144 at least extends through the one skin layer 110 and into the core material of the first sandwich panel 102. Only the insert 142 is configured to accept insertion of the item, while the insert 144 provides an additional securing mechanism for the mechanical fastener 120 to the panel apparatus 100.

Figure 27:
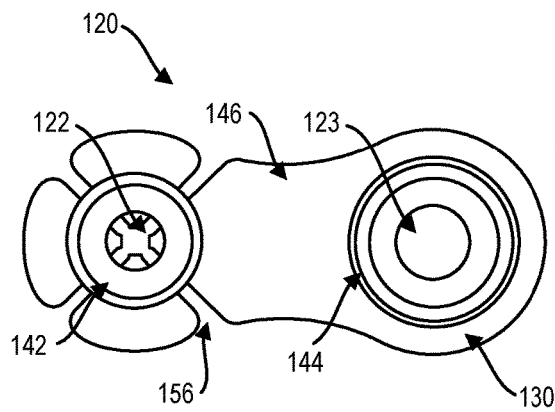
FIG. 27 illustrates a top view of another example of the mechanical fastener with countersink features, according to an example embodiment.
Figure 28:
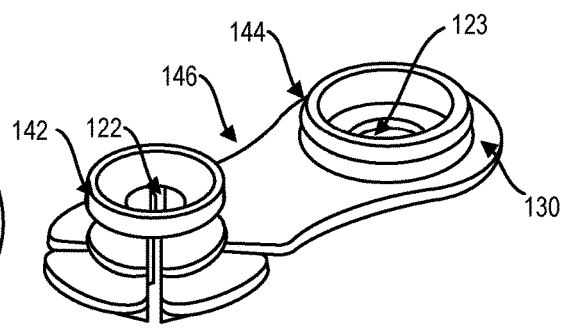
FIG. 28 illustrates a three-dimensional view of the mechanical fastener of FIG. 27, according to an example embodiment.
Figure 29:
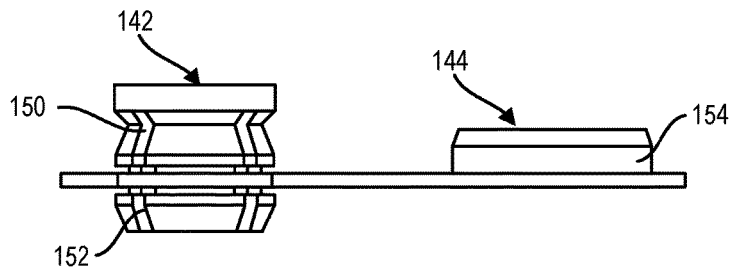
FIG. 29 illustrates a side view of the mechanical fastener of FIG. 27, according to an example embodiment.

FIG. 27 illustrates a top view of another example of the mechanical fastener 120, FIG. 28 illustrates a three-dimensional view of this example of the mechanical fastener 120, and FIG. 29 illustrates a side view of this example of the mechanical fastener 120. In this example, the mechanical fastener 120 is similar to that as shown in FIGS. 23-25, and also includes countersink features defined by slots, such as slot 156, around a perimeter of the insert 142 and the slots 156 around an axis of the insert 142 to enable the walls to be more flexible and more easily deflect and engage the panel skins. Insert 144 may be the same as described with respect to FIGS. 23-25.

Figure 30:
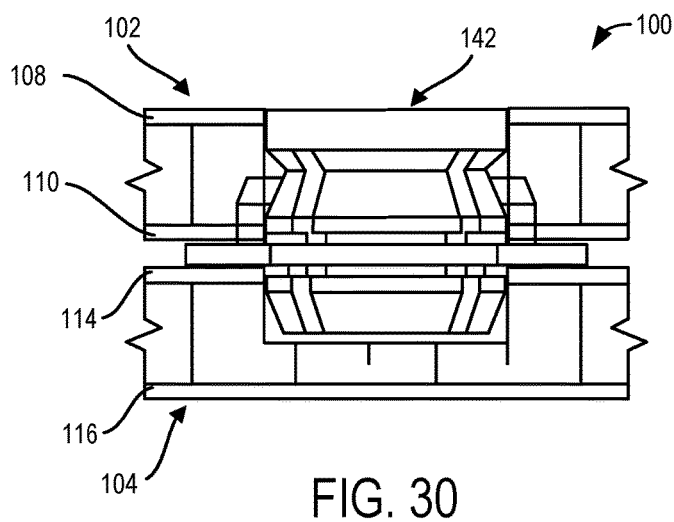
FIG. 30 illustrates an example of the mechanical fastener embedded into the first sandwich panel and the second sandwich panel, according to an example embodiment.

FIG. 30 illustrates an example of the mechanical fastener 120 with the countersink features embedded into the first sandwich panel 102 and the second sandwich panel 104. In this example, the insert 142 at least extends through the one skin layer 110 and into the core material of the first sandwich panel 102 and at least extends through the one skin layer 114 and into the core material of the second sandwich panel 104. Only the insert 142 is shown in FIG. 30. The flange 130 is positioned in a gap between the first sandwich panel 102 and the second sandwich panel 104. The countersink features include the slots 156 so that when an item is driven into the insert 142, the countersink features expand to retain the item and the first sandwich panel 102 and the second sandwich panel 104 together. For example, engagement with the panel skins here involves expansion of portions of the insert 142 as a result of installation of an item. The insert 142 may also snap into the panel, and expansion results due to an item installation.

Figure 31:
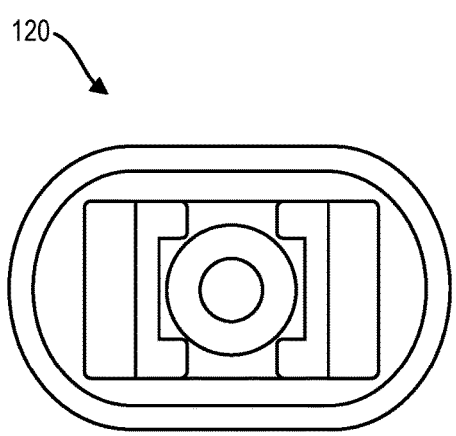
FIG. 31 illustrates a top view of another example of the mechanical fastener, according to an example embodiment.
Figure 32:
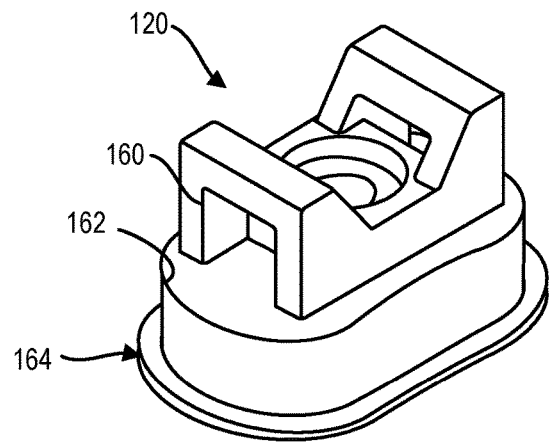
FIG. 32 illustrates a three-dimensional view of the mechanical fastener of FIG. 31, according to an example embodiment.
Figure 33:
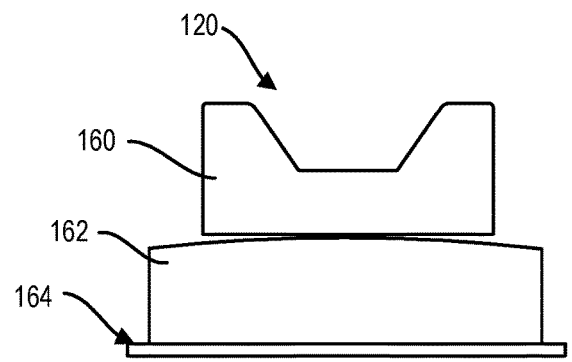
FIG. 33 illustrates a side view of the mechanical fastener of FIG. 31, according to an example embodiment.
Figure 34:
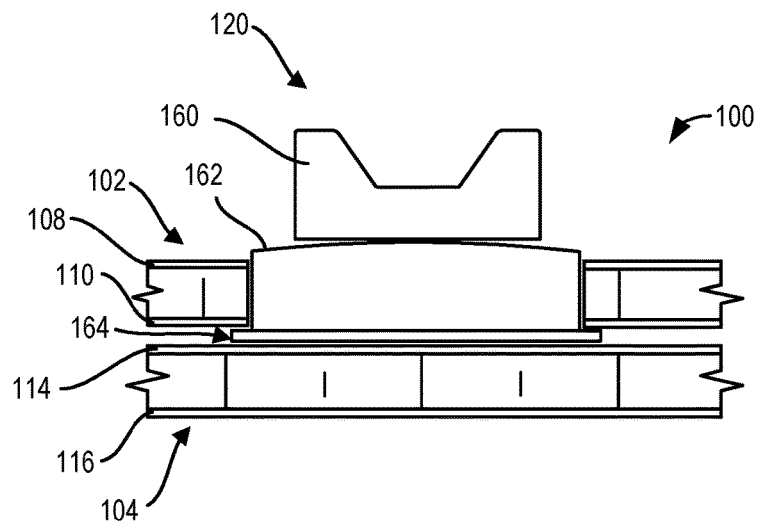
FIG. 34 illustrates an example of the mechanical fastener of FIG. 31 embedded into the first sandwich panel, according to an example embodiment.

FIG. 31 illustrates a top view of another example of the mechanical fastener 120, FIG. 32 illustrates a three-dimensional view of this example of the mechanical fastener 120, and FIG. 33 illustrates a side view of this example of the mechanical fastener 120. In this example, the mechanical fastener 120 includes a wiring mounting saddle 160 with an extended base 162 that is mechanically embedded between the first sandwich panel 102 and the second sandwich panel 104. FIG. 34 illustrates an example of the mechanical fastener 120 with the wiring mounting saddle 160 embedded into the first sandwich panel 102. The mechanical fastener 120 in this example also includes a flange 164 coupled to the extended base 162 to be positioned between the first sandwich panel 102 and the second sandwich panel 104. A wire bundle may be laid on top of the wiring mounting saddle 160 to hold the wires in place. In this example, a non-round shape of the mechanical fastener 120 accommodates torque loads.

Figure 35:
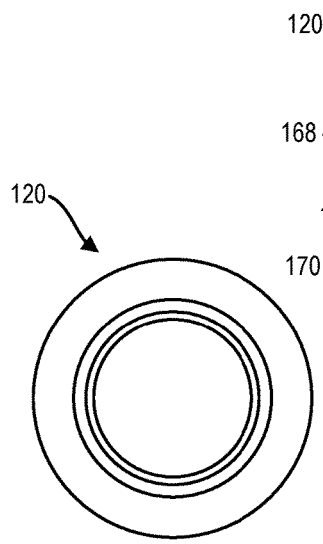
FIG. 35 illustrates a top view of an example of the mechanical fastener as a panel spacer, according to an example embodiment.
Figure 36:
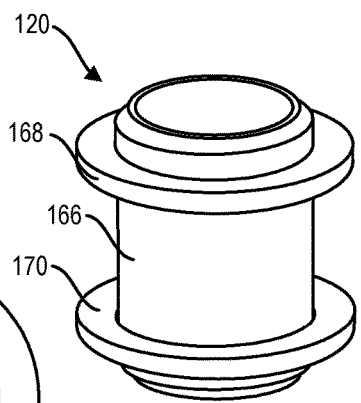
FIG. 36 illustrates a three-dimensional view of the mechanical fastener of FIG. 35, according to an example embodiment.
Figure 37:
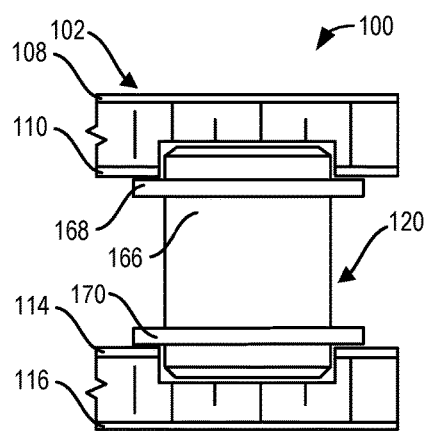
FIG. 37 illustrates a side view of the mechanical fastener of FIG. 35 embedded between the first sandwich panel and the second sandwich panel, according to an example embodiment.

FIG. 35 illustrates a top view of an example of the mechanical fastener 120 as a panel spacer, FIG. 36 illustrates a three-dimensional view of this example of the mechanical fastener 120, and FIG. 37 illustrates an example of the mechanical fastener 120 as a panel spacer embedded between the first sandwich panel 102 and the second sandwich panel 104. The mechanical fastener 120 in this example includes a center portion 166 between flanges 168 and 170. The panel spacer is mechanically embedded into the first sandwich panel 102 and the second sandwich panel 104 such that the panel spacer extends through one skin layer 110 and into the core material of the first sandwich panel 102 and extends through one skin layer 114 and into the core material of the second sandwich panel 104. The panel spacer maintains spacing between the first sandwich panel 102 and the second sandwich panel 104 and further transfers load across the first sandwich panel 102 and the second sandwich panel 104.

Figure 38:
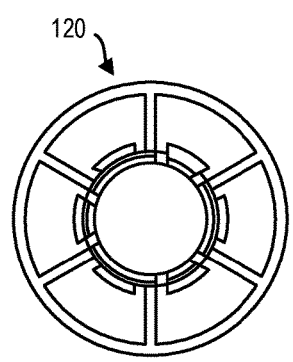
FIG. 38 illustrates a top view of an example of the mechanical fastener as another panel spacer, according to an example embodiment.
Figure 39:
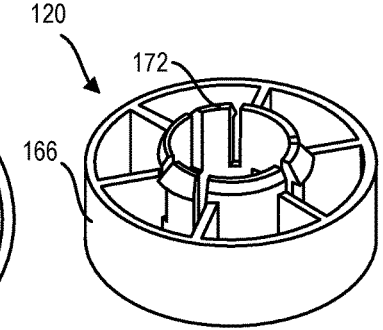
FIG. 39 illustrates a three-dimensional view of the mechanical fastener of FIG. 38, according to an example embodiment.
Figure 40:
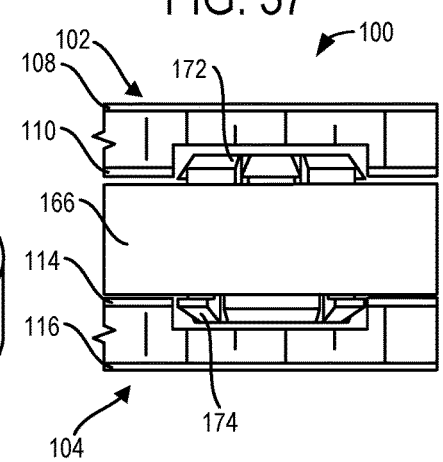
FIG. 40 illustrates a side view of the mechanical fastener of FIG. 38 embedded between the first sandwich panel and the second sandwich panel, according to an example embodiment.

FIG. 38 illustrates a top view of an example of the mechanical fastener 120 as another panel spacer, FIG. 39 illustrates a three-dimensional view of this example of the mechanical fastener 120, and FIG. 40 illustrates an example of the mechanical fastener 120 as the panel spacer embedded between the first sandwich panel 102 and the second sandwich panel 104. The mechanical fastener 120 in this example illustrates a panel spacer, similar to that shown in FIGS. 35-37, but the center portion 166 is less wide to accommodate a smaller gap between the first sandwich panel 102 and the second sandwich panel 104. In this example, the panel spacer also includes engagement features 172 and 174 to engage the first sandwich panel 102 and the second sandwich panel 104.

Figure 41:
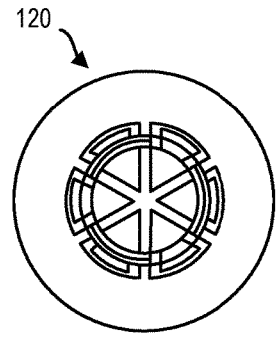
FIG. 41 illustrates a top view of an example of the mechanical fastener as yet another panel spacer, according to an example embodiment.
Figure 42:
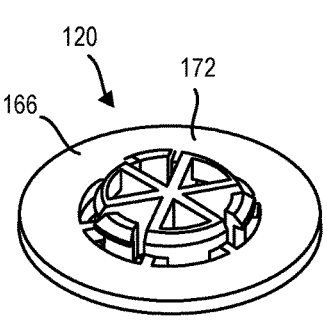
FIG. 42 illustrates a three-dimensional view of the mechanical fastener of FIG. 41, according to an example embodiment.
Figure 43:
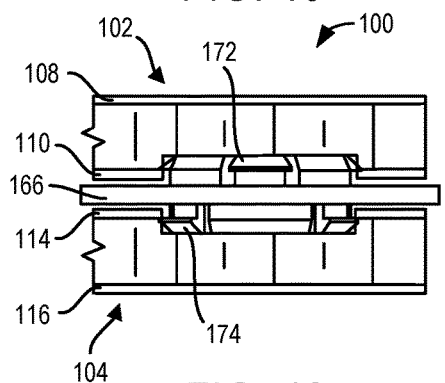
FIG. 43 illustrates a side view of the mechanical fastener of FIG. 41 embedded between the first sandwich panel and the second sandwich panel, according to an example embodiment.

FIG. 41 illustrates a top view of an example of the mechanical fastener 120 as yet another panel spacer, FIG. 42 illustrates a three-dimensional view of this example of the mechanical fastener 120, and FIG. 43 illustrates an example of the mechanical fastener 120 as a panel spacer embedded between the first sandwich panel 102 and the second sandwich panel 104. The mechanical fastener 120 in this example illustrates a panel spacer, similar to that shown in FIGS. 38-40, but that the center portion 166 is still narrower to accommodate a smaller gap.

Figure 44:
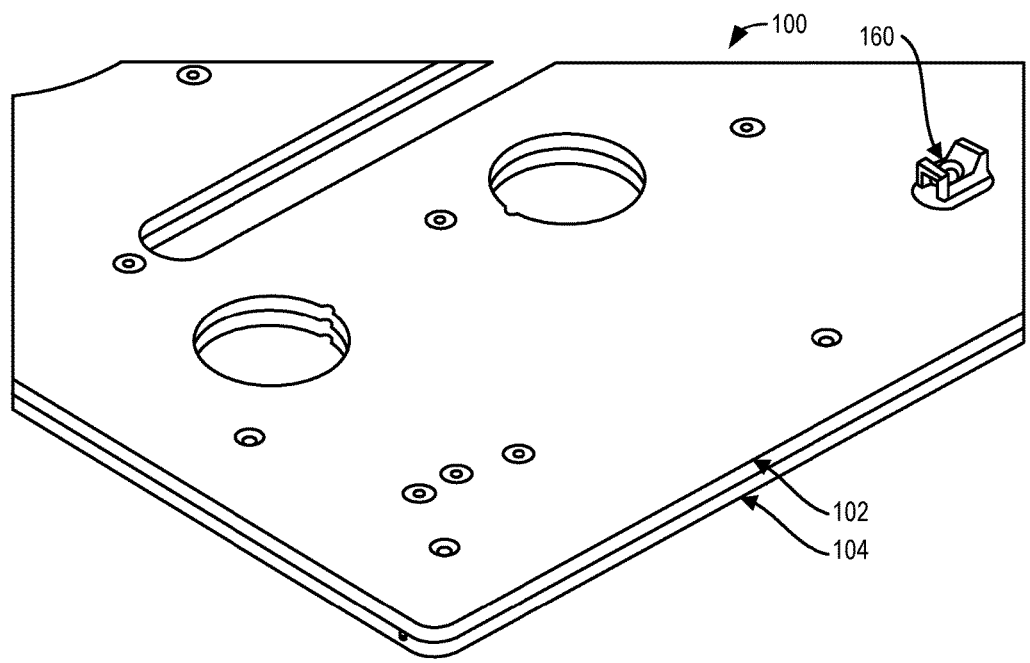
FIG. 44 illustrates an example panel apparatus with mechanical fasteners installed, according to an example embodiment.
Figure 45:
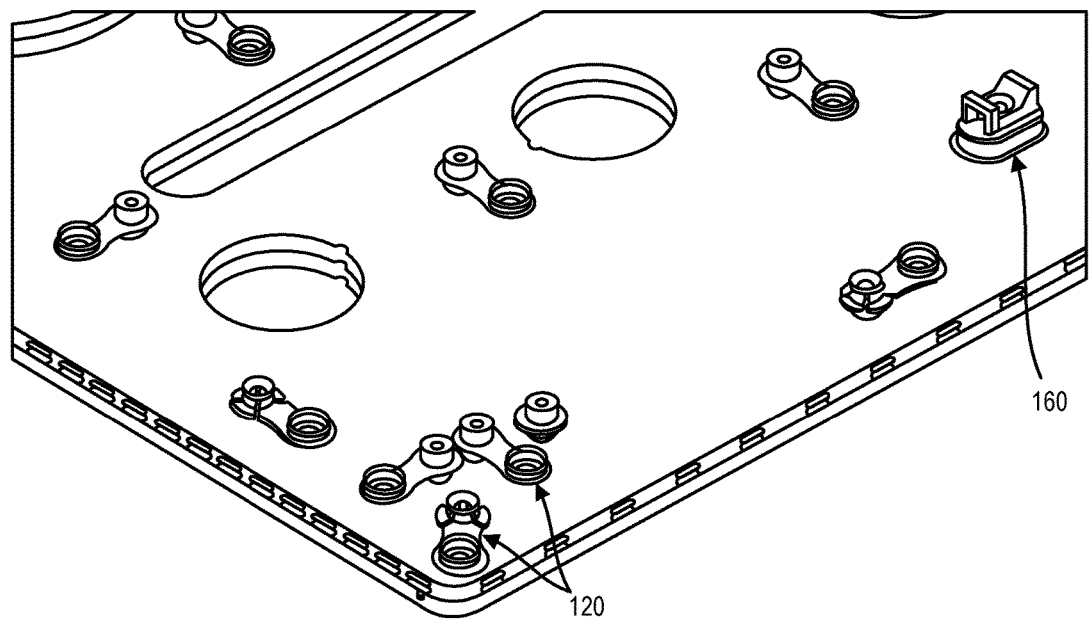
FIG. 45 illustrates the example panel apparatus of FIG. 44, with the first sandwich panel translucent in this view to show the mechanical fasteners, according to an example embodiment.

FIGS. 44-45 illustrate an example panel apparatus 100 with mechanical fasteners installed. FIG. 44 illustrates the first sandwich panel 102 coupled to the second sandwich panel 104 via mechanical fasteners, and one mechanical fastener includes the wire mounting saddle 160, for example. The panel apparatus 100 in FIG. 44 may be used, for example, as a flat panel on a ceiling that includes a decorative layer on a bottom face of the second sandwich panel 104 in this view, and a non-decorative surface on a top face of the first sandwich panel 102 in this view. FIG. 45 illustrates the example panel apparatus 100 of FIG. 44, with the first sandwich panel 102 translucent in this view to show the mechanical fasteners 120. In this example, the panel apparatus 100 includes multiple mechanical fasteners mechanically embedded into one of the first sandwich panel and the second sandwich panel, and many are configured to accept insertion of an item. Any number of mechanical fasteners may be included, and addition of more mechanical fasteners provides additional strength to the panel apparatus 100 per unit area.

Figure 46:
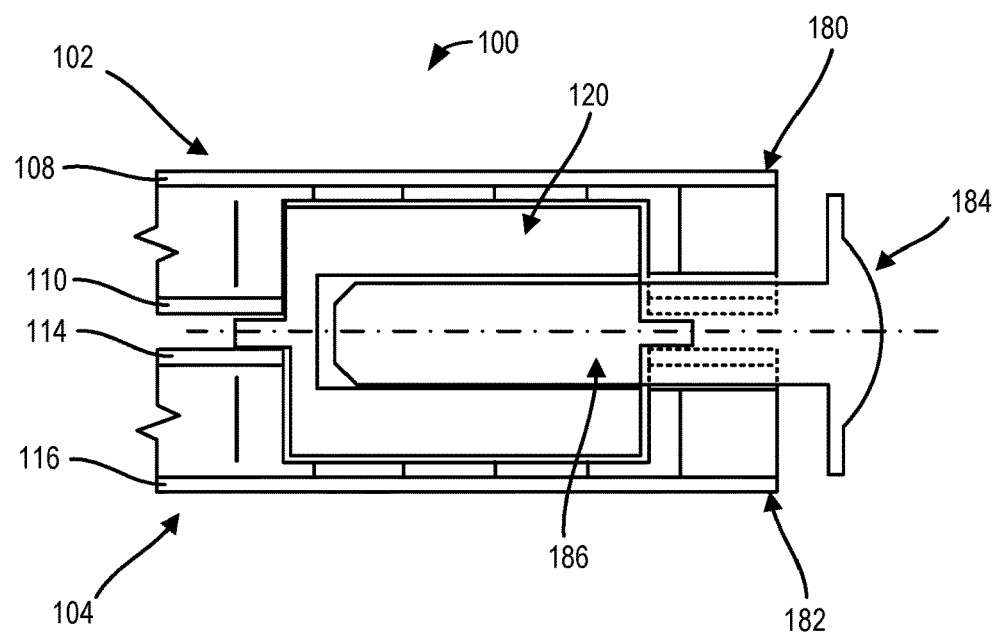
FIG. 46 illustrates an example of the panel apparatus including mechanical fasteners positioned as an edge insert, according to an example embodiment.
Figure 47:
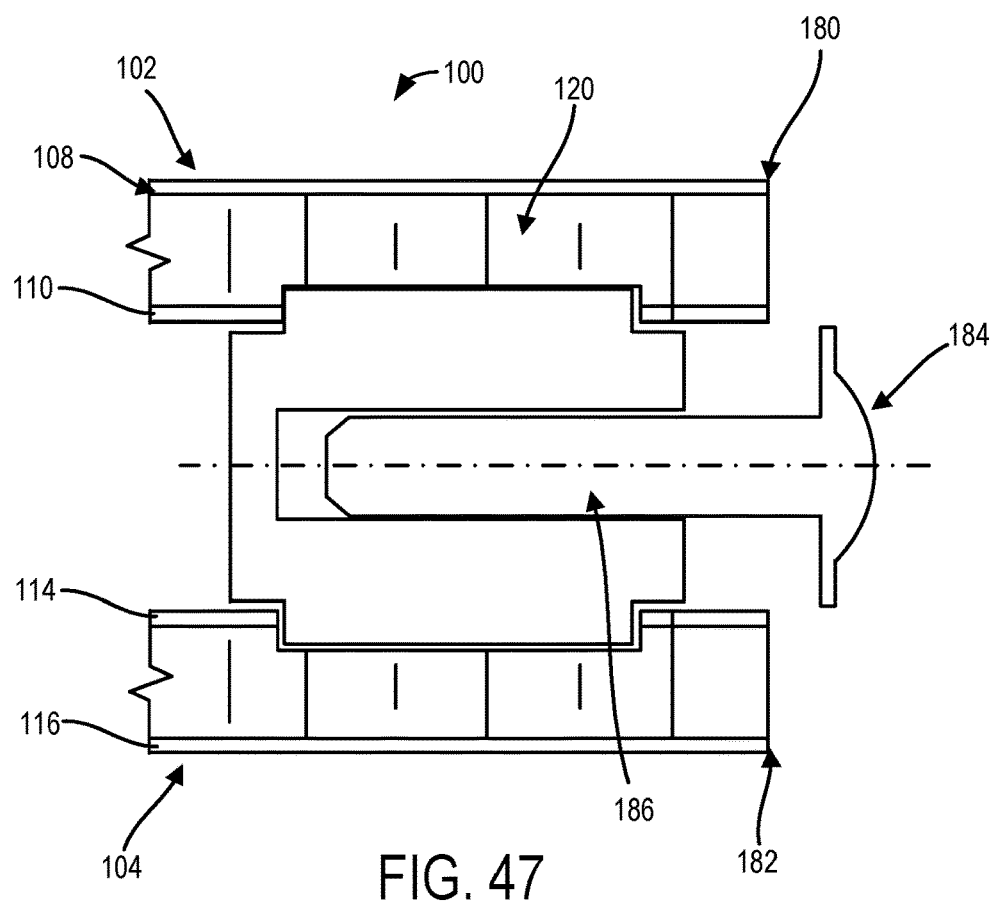
FIG. 47 illustrates the mechanical fastener of FIG. 46 installed between the first sandwich panel and the second sandwich panel, according to an example embodiment.

FIGS. 46-47 illustrate examples of the panel apparatus 100 including mechanical fasteners positioned as edge inserts. In this example, the mechanical fastener 120 is mechanically embedded into the first sandwich panel 102 and the second sandwich panel 104 proximal to side edges 180 and 182, of the first sandwich panel 102 and the second sandwich panel 104. The mechanical fastener 120 is configured to accept insertion of an item 184 into an opening 186 of the mechanical fastener 120 through the side edges 180 and 182. The mechanical fastener 120 as an edge insert provides a way to attach features to panel edges as well as maintain panel separation and transfers load across the panels. FIG. 47 illustrates the mechanical fastener 120 of FIG. 46 installed between the first sandwich panel 102 and the second sandwich panel 104, but with wider dimensions to accommodate a larger spacing between the panels.

Figure 48:
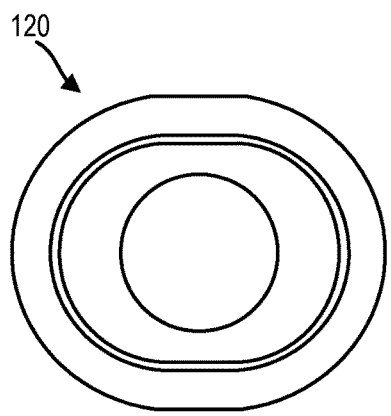
FIG. 48 illustrates a top view of an example of the mechanical fastener as an edge insert, according to an example embodiment.
Figure 49:
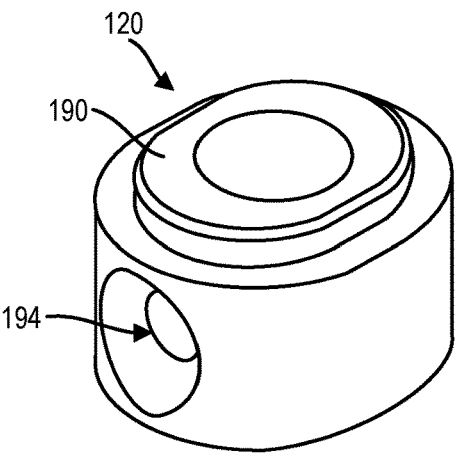
FIG. 49 illustrates a three-dimensional view of the mechanical fastener of FIG. 48, according to an example embodiment.
Figure 50:
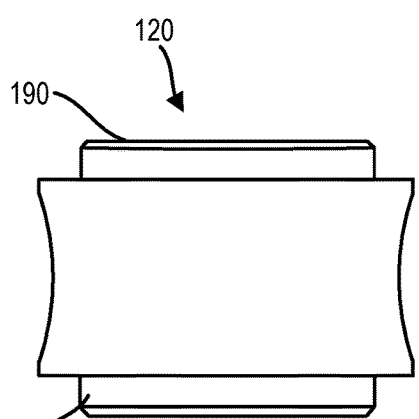
FIG. 50 illustrates a side view of the mechanical fastener of FIG. 48, according to an example embodiment.
Figure 51:
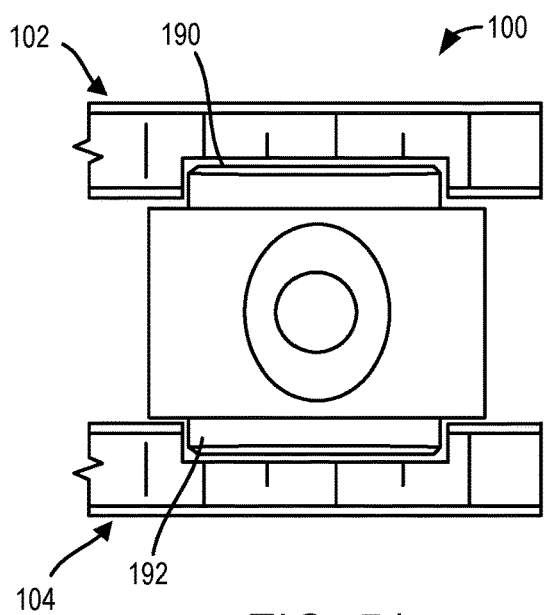
FIG. 51 illustrates a side view of the mechanical fastener of FIG. 48 embedded between the first sandwich panel and the second sandwich panel, according to an example embodiment.

FIG. 48 illustrates a top view of an example of the mechanical fastener 120 as an edge insert, FIG. 49 illustrates a three-dimensional view of this example of the mechanical fastener 120, and FIG. 50 illustrates a side view of this example of the mechanical fastener 120, and FIG. 51 illustrates an example of the mechanical fastener 120 as an edge insert embedded between the first sandwich panel 102 and the second sandwich panel 104. In this example, the mechanical fastener 120 includes a top portion 190 embedded into the first sandwich panel 102 and a bottom portion 192 embedded into the second sandwich panel 104, and an opening 194 to receive an item. The opening 194 can be threaded to receive a screw, for example.

Figure 52:
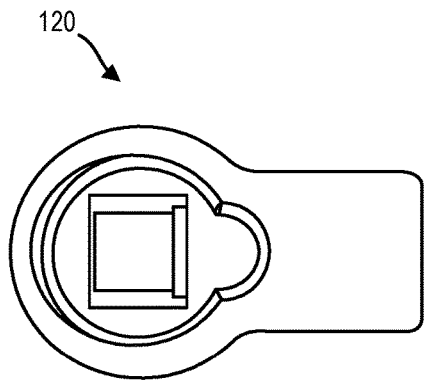
FIG. 52 illustrates a top view of an example of the mechanical fastener as another edge insert, according to an example embodiment.
Figure 53:
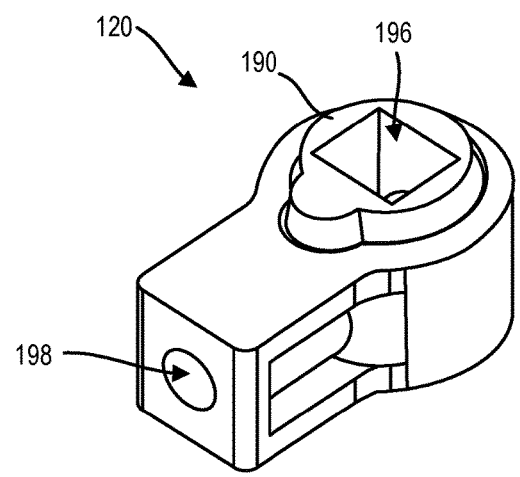
FIG. 53 illustrates a three-dimensional view of the mechanical fastener of FIG. 52, according to an example embodiment.
Figure 54:
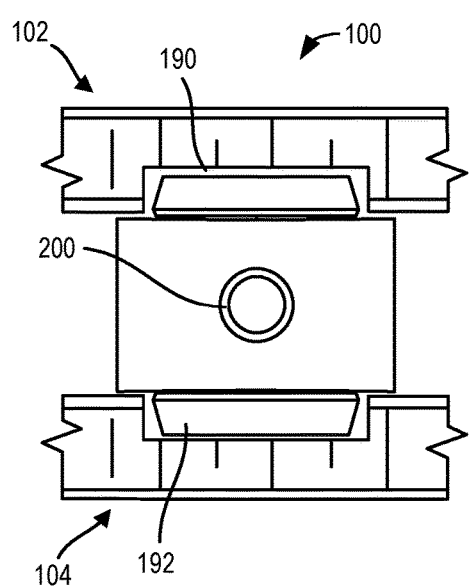
FIG. 54 illustrates an end view of the mechanical fastener of FIG. 52 embedded between the first sandwich panel and the second sandwich panel, according to an example embodiment.
Figure 55:
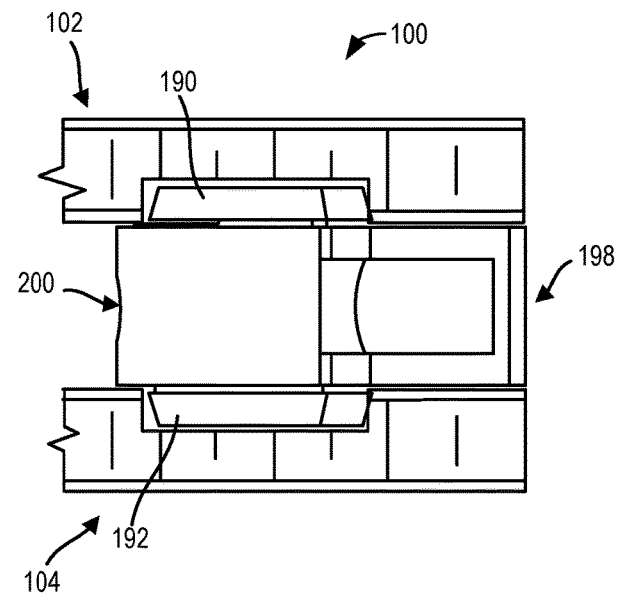
FIG. 55 illustrates a side view of the mechanical fastener of FIG. 52 as an edge insert embedded between the first sandwich panel and the second sandwich panel, according to an example embodiment.

FIG. 52 illustrates a top view of an example of the mechanical fastener 120 as another edge insert, FIG. 53 illustrates a three-dimensional view of this example of the mechanical fastener 120, and FIG. 54 illustrates an end view of this example of the mechanical fastener 120 embedded between the first sandwich panel 102 and the second sandwich panel 104, and FIG. 55 illustrates a side view of the mechanical fastener 120 as an edge insert embedded between the first sandwich panel 102 and the second sandwich panel 104. In this example, the mechanical fastener 120 includes the top portion 190 embedded into the first sandwich panel 102 and the bottom portion 192 embedded into the second sandwich panel 104, and has an opening 196 on a top to receive an item and an opening 198 on an end to receive an item through the side edge. The mechanical fastener 120 also includes an opening 200 to receive an item through another side, for example.

Figure 56:
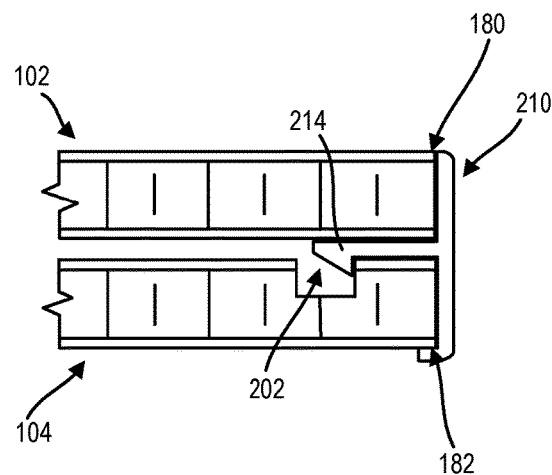
FIG. 56 illustrates a side view of an example of the panel apparatus including a panel trim, according to an example embodiment.

FIG. 56 illustrates a side view of an example of the panel apparatus including a panel trim 210. The panel trim 210 can help to secure the first sandwich panel 102 and the second sandwich panel 104 to each other, and attaches to side edges 180 and 182 of the first sandwich panel 102 and the second sandwich panel 104. In this example, the panel trim 210 includes a retention feature 214 that extends between the first sandwich panel 102 and the second sandwich panel 104 through the side edges 180 and 182 and engages with a slot 202 on a skin layer of one of the first sandwich panel and the second sandwich panel (e.g., with the second sandwich panel 104 as shown in FIG. 56).

Figure 57:
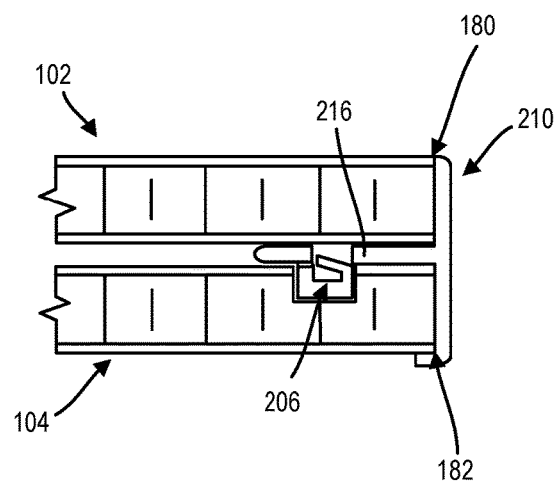
FIG. 57 illustrates a side view of another example of the panel apparatus including the panel trim, according to an example embodiment.

FIG. 57 illustrates a side view of another example of the panel apparatus including the panel trim 210. In FIG. 57, the panel trim 210 includes a slot feature 216 that extends between the first sandwich panel 102 and the second sandwich panel 104 through the side edges 180 and 182 and engages with a retention feature 206 on a skin layer of one of the first sandwich panel and the second sandwich panel (e.g., with the second sandwich panel 104 as shown in FIG. 56).

Figure 58:
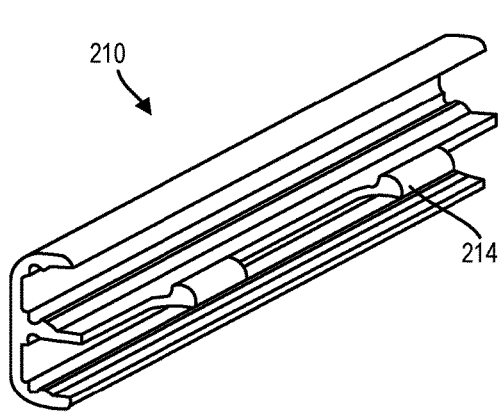
FIG. 58 illustrates a perspective view of an example of the panel trim, according to an example embodiment.
Figure 59:
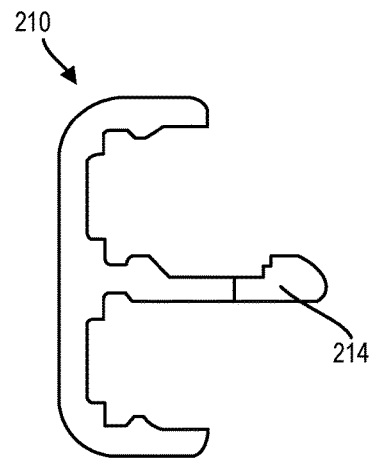
FIG. 59 illustrates an end view of the panel trim of FIG. 58, according to an example embodiment.

FIG. 58 illustrates a perspective view of an example of the panel trim 210, and FIG. 59 illustrates an end view of the example of the panel trim 210. In FIG. 59, the panel trim 210 is shown to include a stepped hook feature on the retention feature 214.

Figure 60:
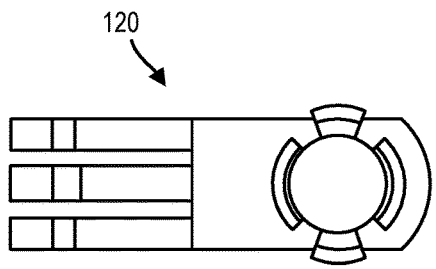
FIG. 60 illustrates a top view of an example of the mechanical fastener as a trim snap feature, according to an example embodiment.
Figure 61:
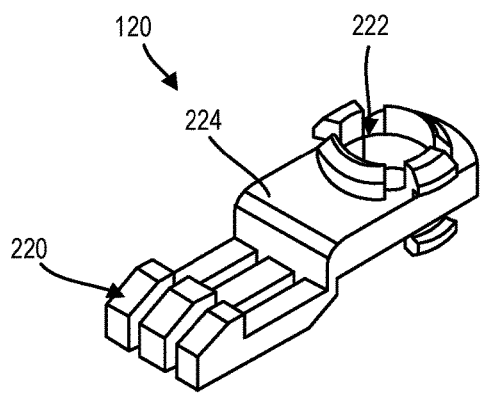
FIG. 61 illustrates a three-dimensional view of the mechanical fastener of FIG. 60, according to an example embodiment.
Figure 62:
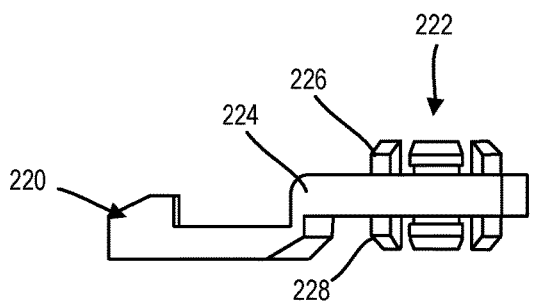
FIG. 62 illustrates a side view of the mechanical fastener of FIG. 60, according to an example embodiment.
Figure 63:
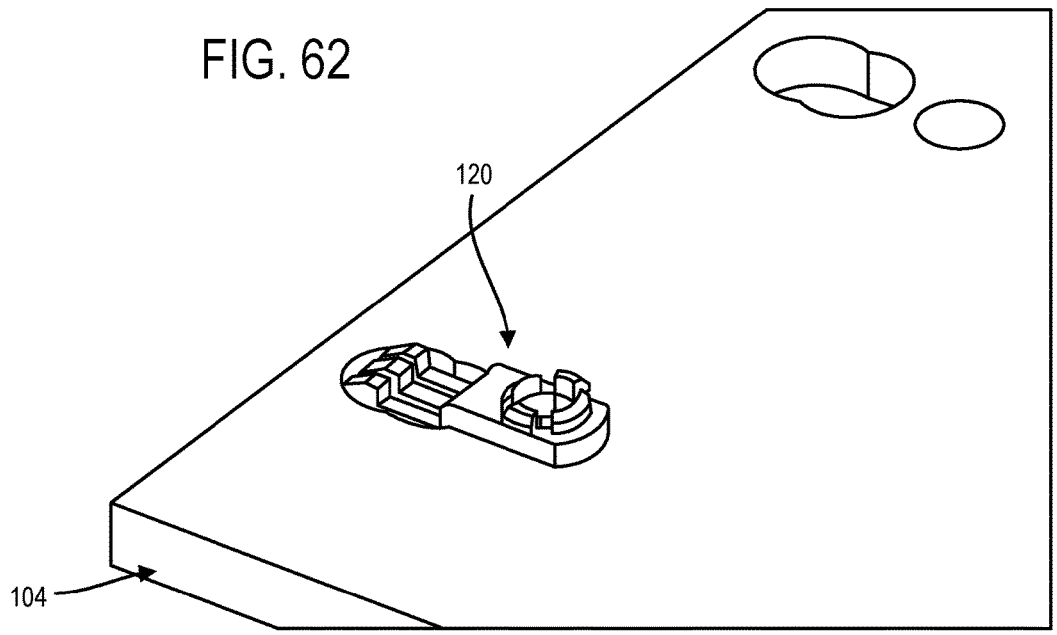
FIG. 63 illustrates a perspective view of the mechanical fastener of FIG. 60 as the trim snap feature inserted into the second sandwich panel, according to an example embodiment.

FIG. 60 illustrates a top view of an example of the mechanical fastener 120 as a trim snap feature, FIG. 61 illustrates a three-dimensional view of this example of the mechanical fastener 120, FIG. 62 illustrates a side view of this example of the mechanical fastener 120, and FIG. 63 illustrates a perspective view of the mechanical fastener 120 as the trim snap feature inserted into the second sandwich panel 104. The mechanical fastener 120 in this example includes paired features 220 and 222 connected by an arm 224, as well as engagement features 226 and 228 on the feature 222. The feature 222 may include hook features with serrations (or steps), so that variations in part geometry and tolerances can be accommodated.

Figure 64:
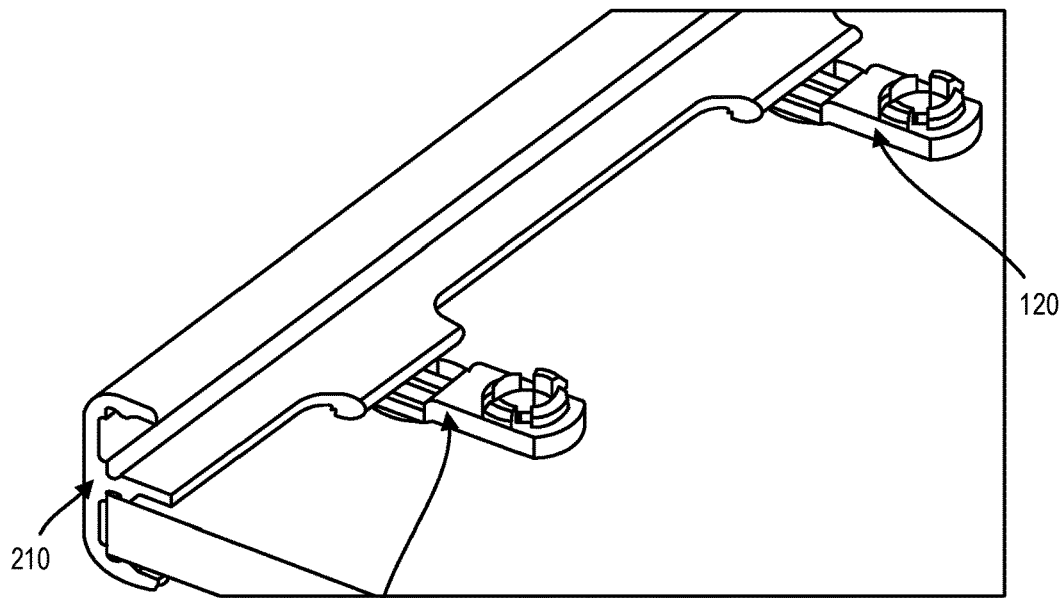
FIG. 64 illustrates an example perspective view of the mechanical fastener as the trim snap feature inserted into the second sandwich panel, and the panel trim secured to the mechanical fastener, according to an example embodiment.
Figure 65:
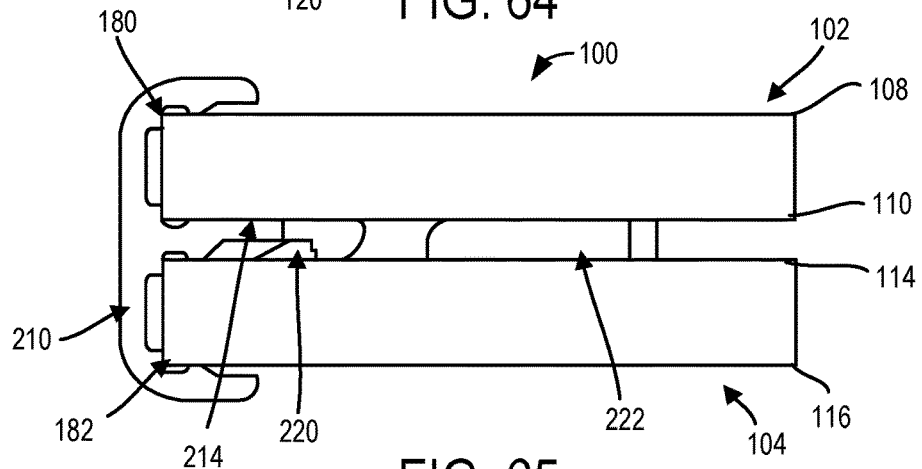
FIG. 65 illustrates an example side view of the mechanical fastener as the trim snap feature inserted between the first sandwich panel and the second sandwich panel, according to an example embodiment.
Figure 66:
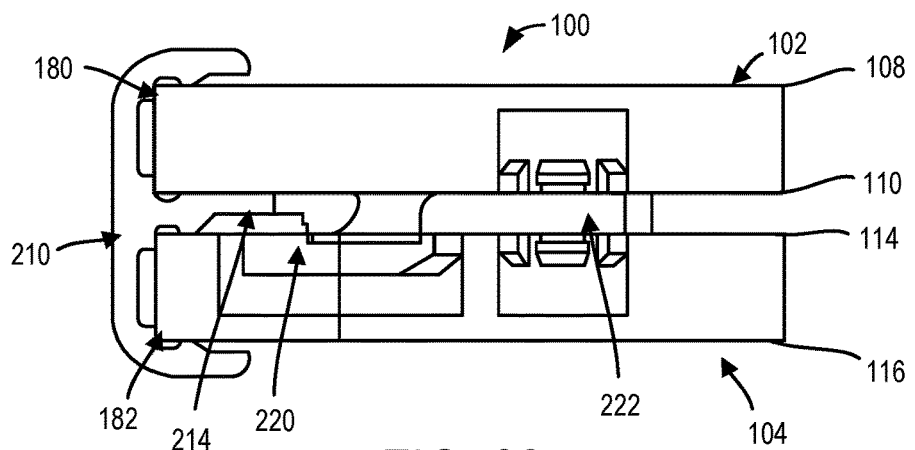
FIG. 66 illustrates an example side view of the mechanical fastener as the trim snap feature with the first sandwich panel and the second sandwich panel translucent, according to an example embodiment.

FIG. 64 illustrates an example perspective view of the mechanical fastener 120 as the trim snap feature inserted into the second sandwich panel 104, and the panel trim 210 secured to the mechanical fastener. FIGS. 65-66 illustrate example side views of the mechanical fastener 120 as the trim snap feature inserted between the first sandwich panel 102 and the second sandwich panel 104, and the panel trim 210 securing the first sandwich panel 102 and the second sandwich panel 104 to each other. The panel trim 210 is installed to the side edges 180 and 182 of the first sandwich panel 102 and the second sandwich panel 104 and also includes the retention feature 214 that attaches to the feature 220. The retention feature 214 may snap over the feature 220 hook features. As shown in FIGS. 65-66, the feature 222 extends through the one skin layer 110 and into the core material of the first sandwich panel 102 and extends through the one skin layer 114 and into the core material of the second sandwich panel 104, and the feature 220 extends through the one skin layer 114 and into the core material of the second sandwich panel 104. The mechanical fastener 120 in this example is mechanically embedded into the first sandwich panel 102 and the second sandwich panel 104 proximal to the side edges 180 and 182, and the feature 220 is configured to accept insertion of an item into a gap between the first sandwich panel 102 and the second sandwich panel 104 through the side edges 180 and 182. The panel trim 210 prevents the first sandwich panel 102 and the second sandwich panel 104 from separating and maintains the gap positioning, and the panel trim 210 is prevented from being removed due to the feature 220.

Figure 67:
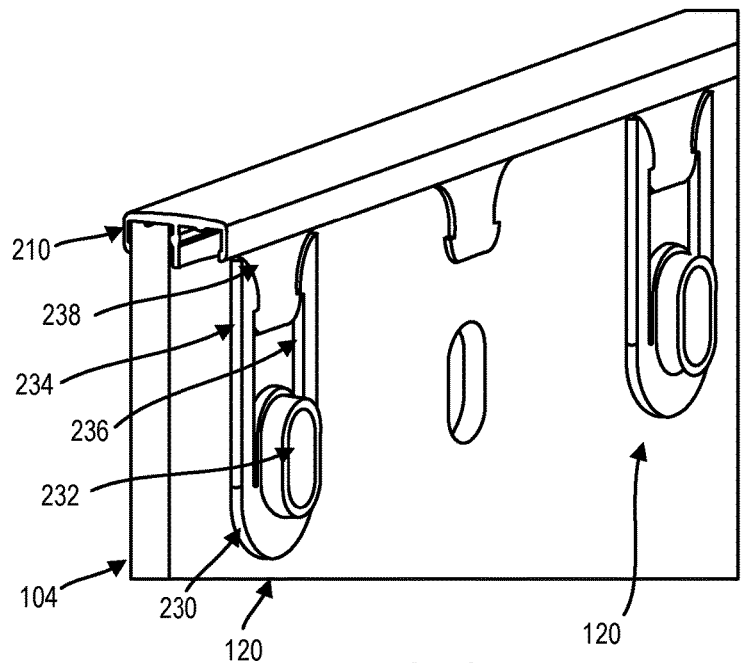
FIG. 67 illustrates an example perspective view of an alternate panel trim assembly, according to an example embodiment.

FIG. 67 illustrates an example perspective view of an alternate panel trim assembly. In this example, the mechanical fastener 120 includes an insert 230 that is embedded into the second sandwich panel 104, and the insert 230 includes an opening 232 configured to receive an item. The mechanical fastener 120 includes arms 234 and 236 connected to the insert 230 that extend to an edge of the second sandwich panel 104. The panel trim 210 includes an arm 238 that slides between the arms 234 and 236 of the mechanical fastener 120 and snaps into place to hold the panel trim in place secured to the second sandwich panel 104. The panel trim 210 may include many arms that couple to many edge inserts.

Figure 69:
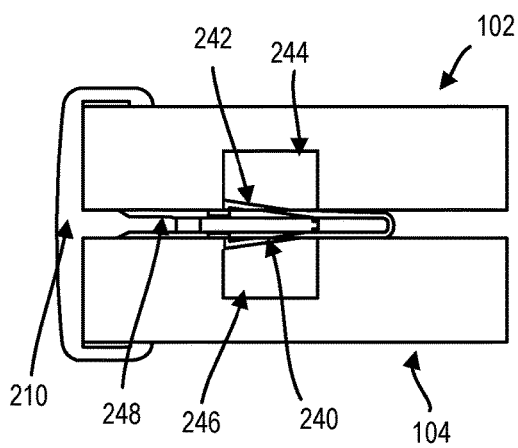
FIG. 69 illustrates an example side view of the panel trim assembly of FIG. 68, according to an example embodiment.
Figure 68:
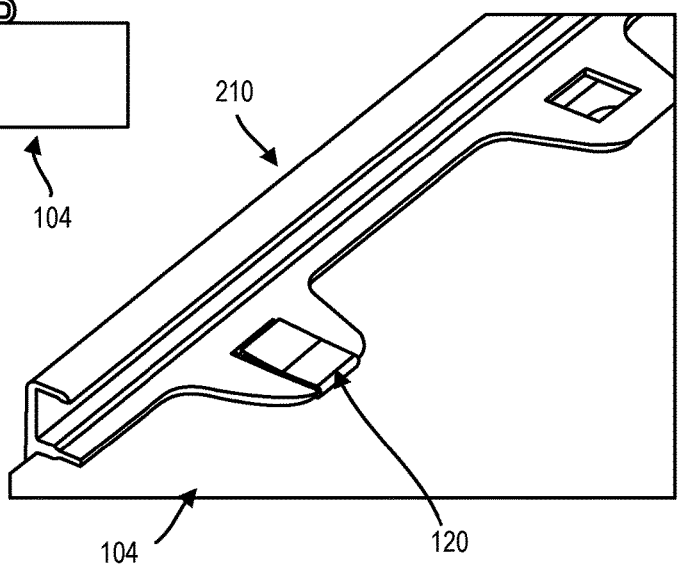
FIG. 68 illustrates an example perspective view of another alternate panel trim assembly, according to an example embodiment.

FIG. 68 illustrates an example perspective view of another alternate panel trim assembly, and FIG. 69 illustrates an example side view of this alternate panel trim assembly. In this example, the mechanical fastener 120 includes snap features 240 and 242 that snap into slots 244 and 246 of the first sandwich panel 102 and the second sandwich panel 104. The panel trim 210 includes an arm 248 that extends between the first sandwich panel 102 and the second sandwich panel 104 and snaps into the snap features 240 and 242 of the mechanical fastener to hold the panel trim secured to the panel assembly.

Figure 70:
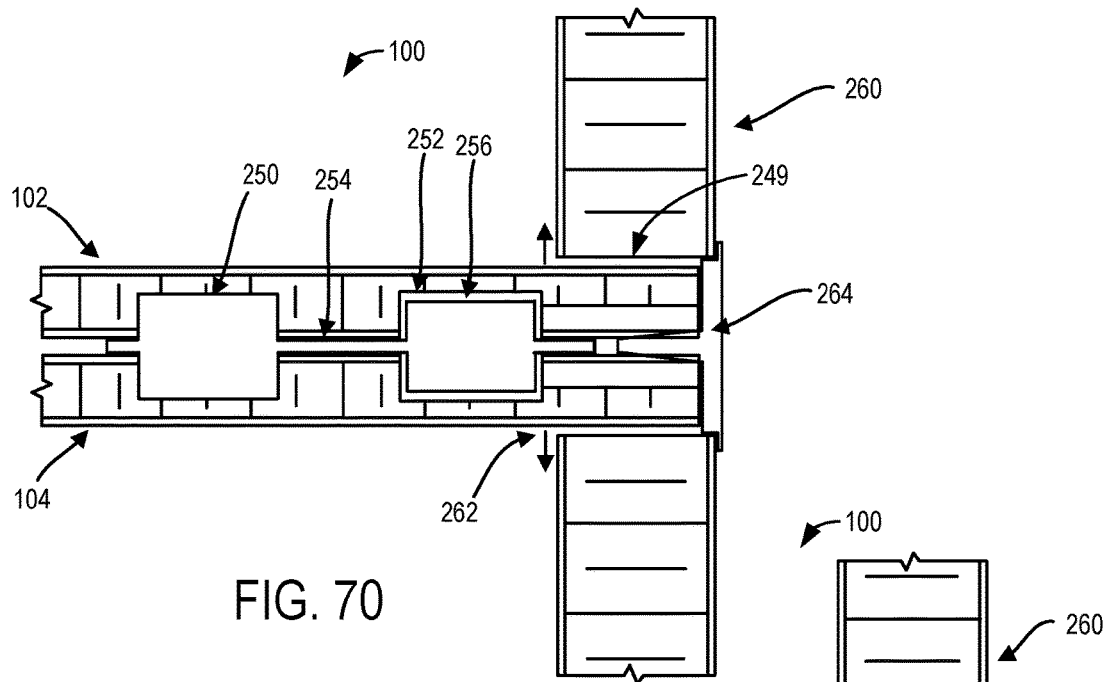
FIG. 70 illustrates an example side view of the first sandwich panel coupled to the second sandwich panel using the mechanical fastener that includes a panel joint, according to an example embodiment.
Figure 71:
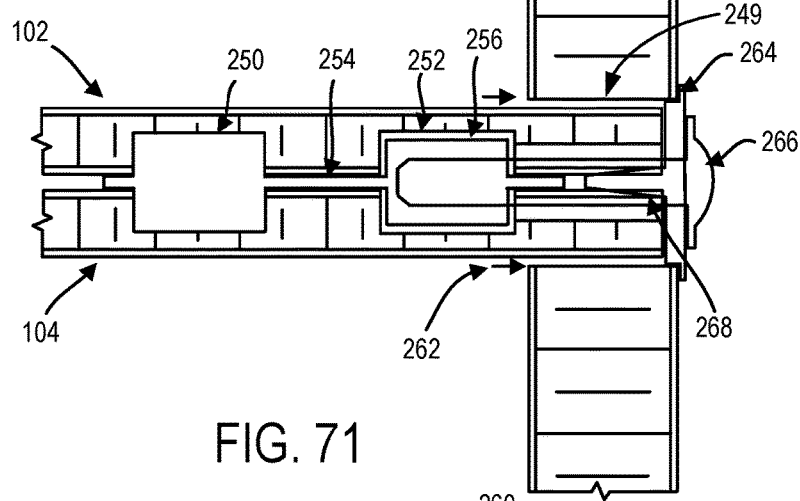
FIG. 71 illustrates an example side view of the panel joint of FIG. 70 including a fastener component, according to an example embodiment.
Figure 72:
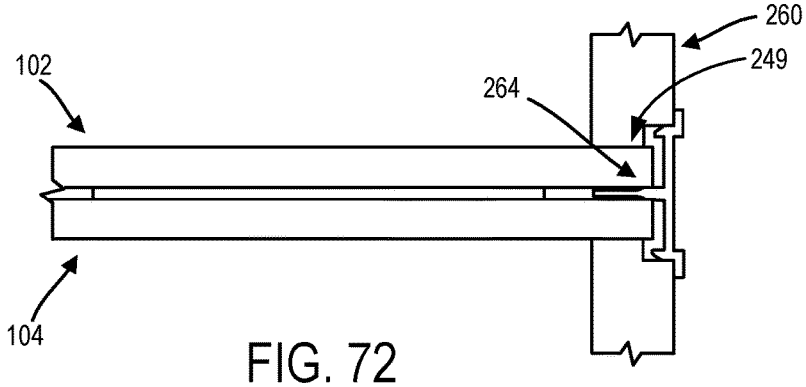
FIG. 72 illustrates an example side view of the panel joint of FIG. 70, according to an example embodiment.

FIGS. 70-72 illustrate example side views of the mechanical fastener being used and implemented to form a panel joint 249. FIG. 70 illustrates an example side view of the first sandwich panel 102 coupled to the second sandwich panel 104 using the mechanical fastener to form the panel joint 249 with inserts 250 and 252 connected by an arm 254. The inserts 250 and 252 at least extend through the one skin layer and into the core material of the first sandwich panel 102 and at least extend through the one skin layer and into the core material of the second sandwich panel 104, and the panel joint 249 is mechanically created by the first sandwich panel 102 and the second sandwich panel 104 proximal to side edges with a third panel 260 positioned perpendicular to the first sandwich panel 102 and the second sandwich panel 104. The first sandwich panel 102 and second sandwich panel 104 apparatus are inserted into an opening 262 of the third panel 260. A tab block 264 is positioned into the gap between the first sandwich panel 102 and the second sandwich panel 104. In FIG. 70, the insert 250 embedded into the panel skins accommodates loads due to installation of a fastener component and associated design loads. The panel joint 249 is a portion of the panel apparatus 100 where the first sandwich panel 102 and second sandwich panel 104 apparatus are inserted into an opening 262 of the third panel 260.

FIG. 71 illustrates an example side view of the first sandwich panel 102 coupled to the second sandwich panel 104 using the mechanical fastener and including a fastener component 266 positioned through the tab block 264 and through the third panel 260, and further into one of the paired inserts 252 of the panel joint 249 to secure the third panel 260 to the first sandwich panel 102 and the second sandwich panel 104. The mechanical fastener may include a barrel nut 256 into which the fastener component 266 is installed. The tab block 264 may include a tapered shim that spreads upon installation of the fastener component 266 to ensure a tight fit and to pull the joint together.

FIG. 72 illustrates an example end view of the panel joint 249 with the first sandwich panel 102 and the second sandwich panel 104.

Figure 73:
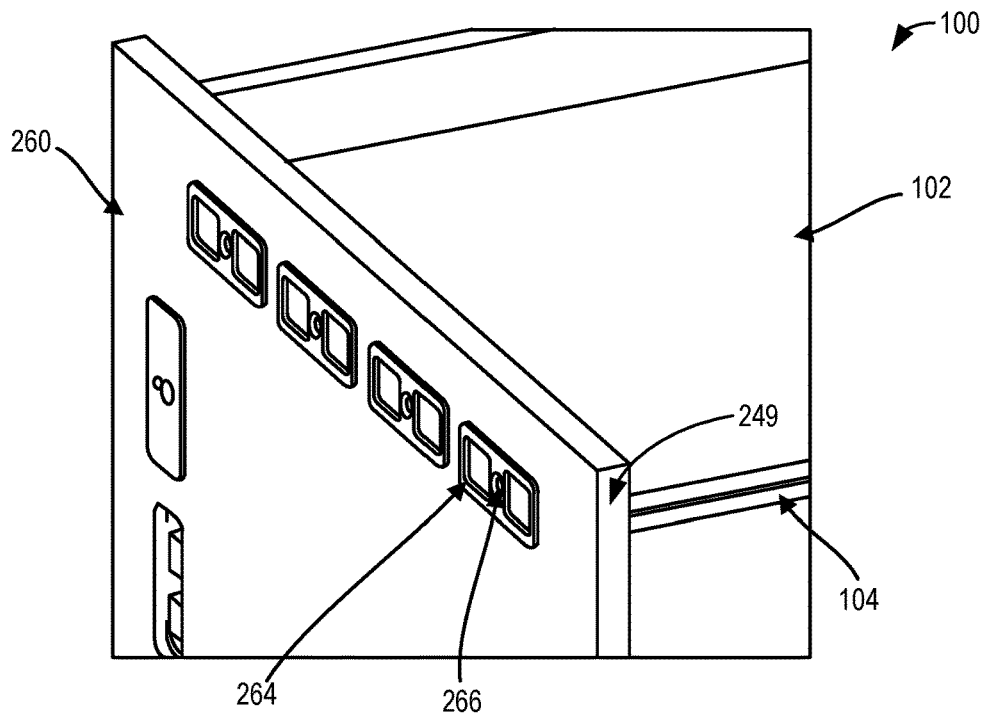
FIG. 73 illustrates a perspective view of an example panel joint, according to an example embodiment.
Figure 74:
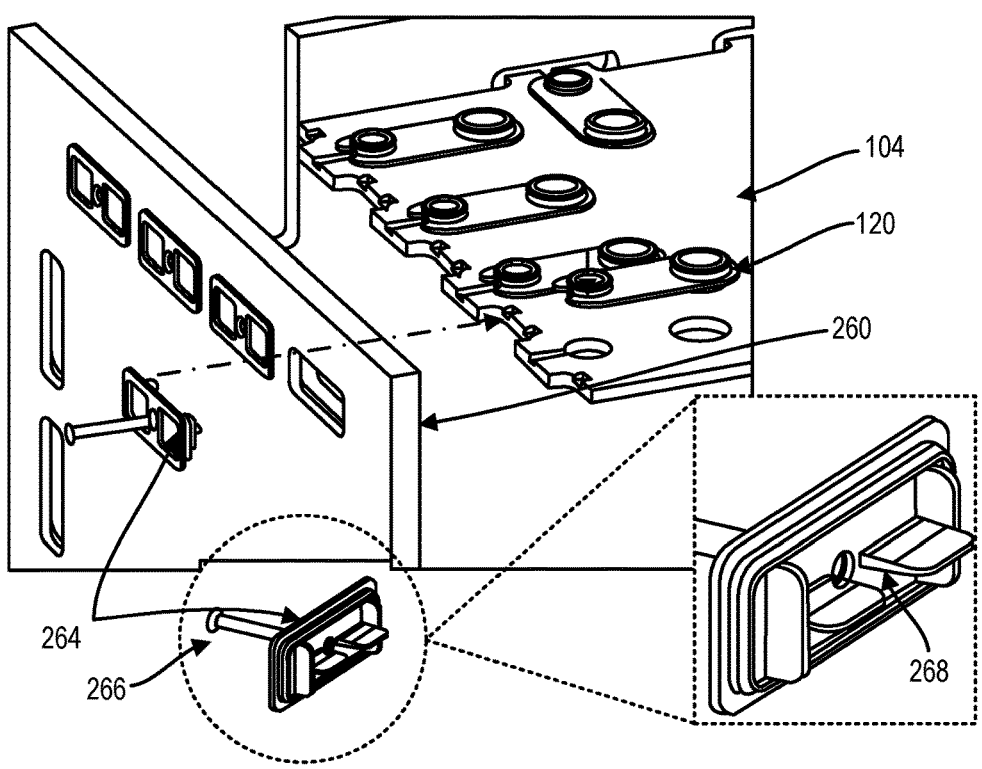
FIG. 74 illustrates an example perspective view of the panel joint FIG. 73 showing additional viewpoints, according to an example embodiment.

FIG. 73 illustrate an example perspective view of the panel joint 249, and FIG. 74 illustrates an example perspective view of the panel joint 249 showing additional viewpoints. In FIG. 73, the first sandwich panel 102 and the second sandwich panel 104 may be coupled for use as a shelf, and mechanical fasteners are hidden within or between the two panels. This provides an aesthetically pleasing view to have inserts hidden between the panels. In FIG. 74, the tab block 264 is shown with a tapered shim feature 268 that is driven between the first sandwich panel 102 and the second sandwich panel 104 for the purpose of spreading them apart slightly to ensure a tight fit with the slots in panel 260, for example. In FIG. 74, only the second sandwich panel 104 is shown.

Figure 75:
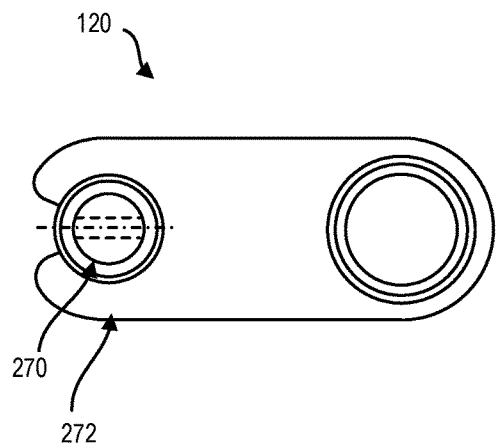
FIG. 75 illustrates an example top view of the mechanical fastener as a panel joint fastener, according to an example embodiment.
Figure 76:
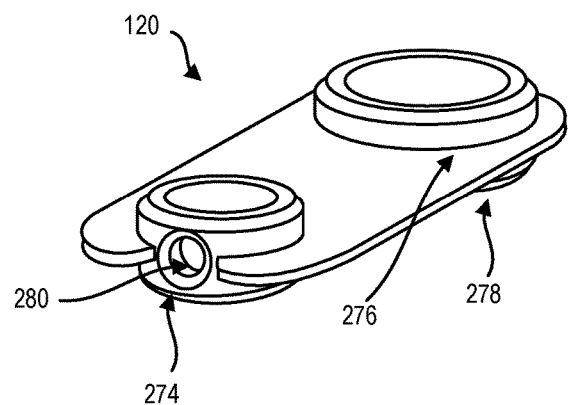
FIG. 76 illustrates an example three dimensional view of the mechanical fastener of FIG. 75, according to an example embodiment.
Figure 77:
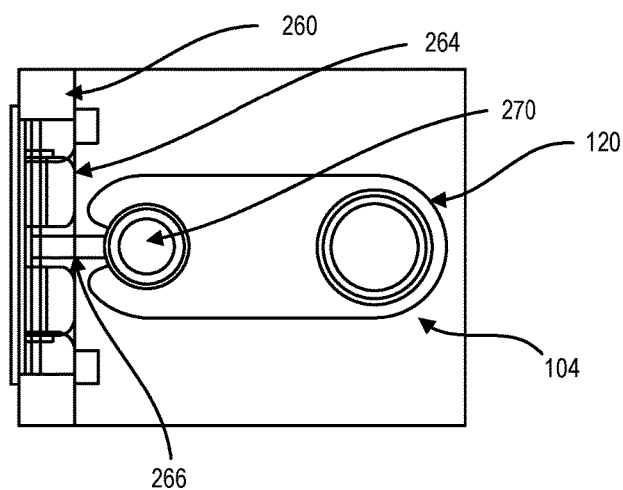
FIG. 77 illustrates an example top view of the mechanical fastener of FIG. 75 installed at a joint, according to an example embodiment.

FIG. 75 illustrates an example top view of the mechanical fastener 120 as a panel joint fastener, FIG. 76 illustrates an example three dimensional view of this mechanical fastener, and FIG. 77 illustrates an example top view of the mechanical fastener 120 installed at a joint. In FIGS. 75 and 76, the mechanical fastener 120 includes a barrel nut 270 with a threaded insertion hole 280 on a first insert 274, and a second insert with a top 276 and bottom 278. The mechanical fastener 120 includes a molded plate 272 between the inserts 274 and the second insert with top 276 and bottom 278. In FIG. 77, the mechanical fastener 120 is shown connecting the third panel 260 to the second sandwich panel 104 using the fastener component 266 (e.g., a threaded screw).

Figure 78:
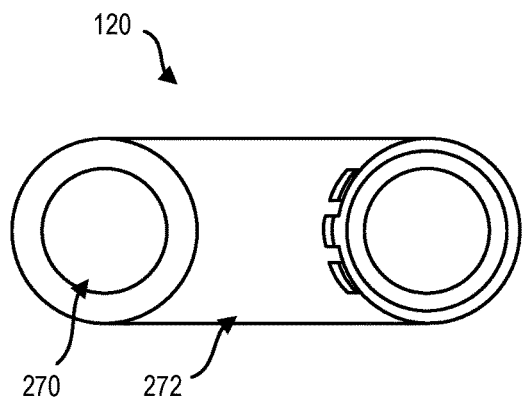
FIG. 78 illustrates an example top view of the mechanical fastener as another panel joint fastener, according to an example embodiment.
Figure 79:
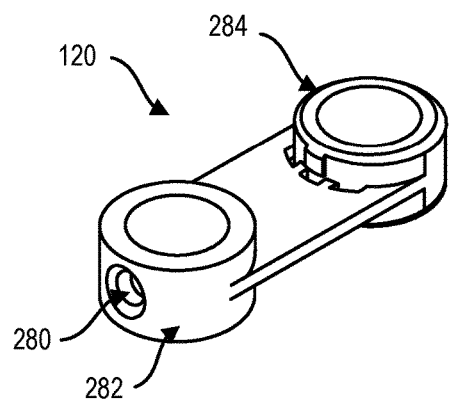
FIG. 79 illustrates an example three dimensional view of the mechanical fastener of FIG. 78, according to an example embodiment.
Figure 80:
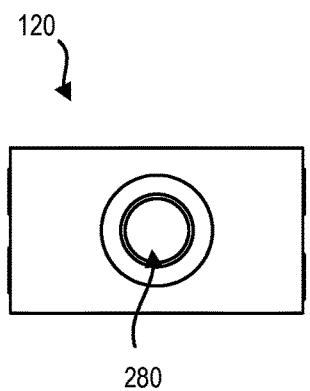
FIG. 80 illustrates an example end view of the mechanical fastener of FIG. 78, according to an example embodiment.
Figure 81:
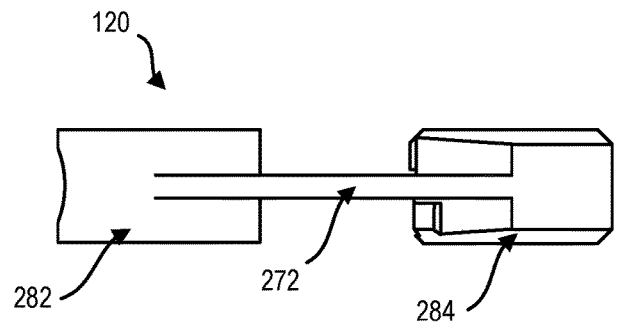
FIG. 81 illustrates an example side view of the mechanical fastener of FIG. 78, according to an example embodiment.

FIG. 78 illustrates an example top view of the mechanical fastener 120 as another panel joint fastener, FIG. 79 illustrates an example three dimensional view of this mechanical fastener, FIG. 80 illustrates an example end view of the mechanical fastener 120 as the panel joint fastener, and FIG. 81 illustrates an example side view of the mechanical fastener 120 as the panel joint fastener. In this example, the mechanical fastener 120 is similar to the example shown in FIGS. 75-77, but that the mechanical fastener includes inserts 282 and 284 in which a flange periphery has been reduced and the insert 284 includes panel engagement features.

Figure 82:
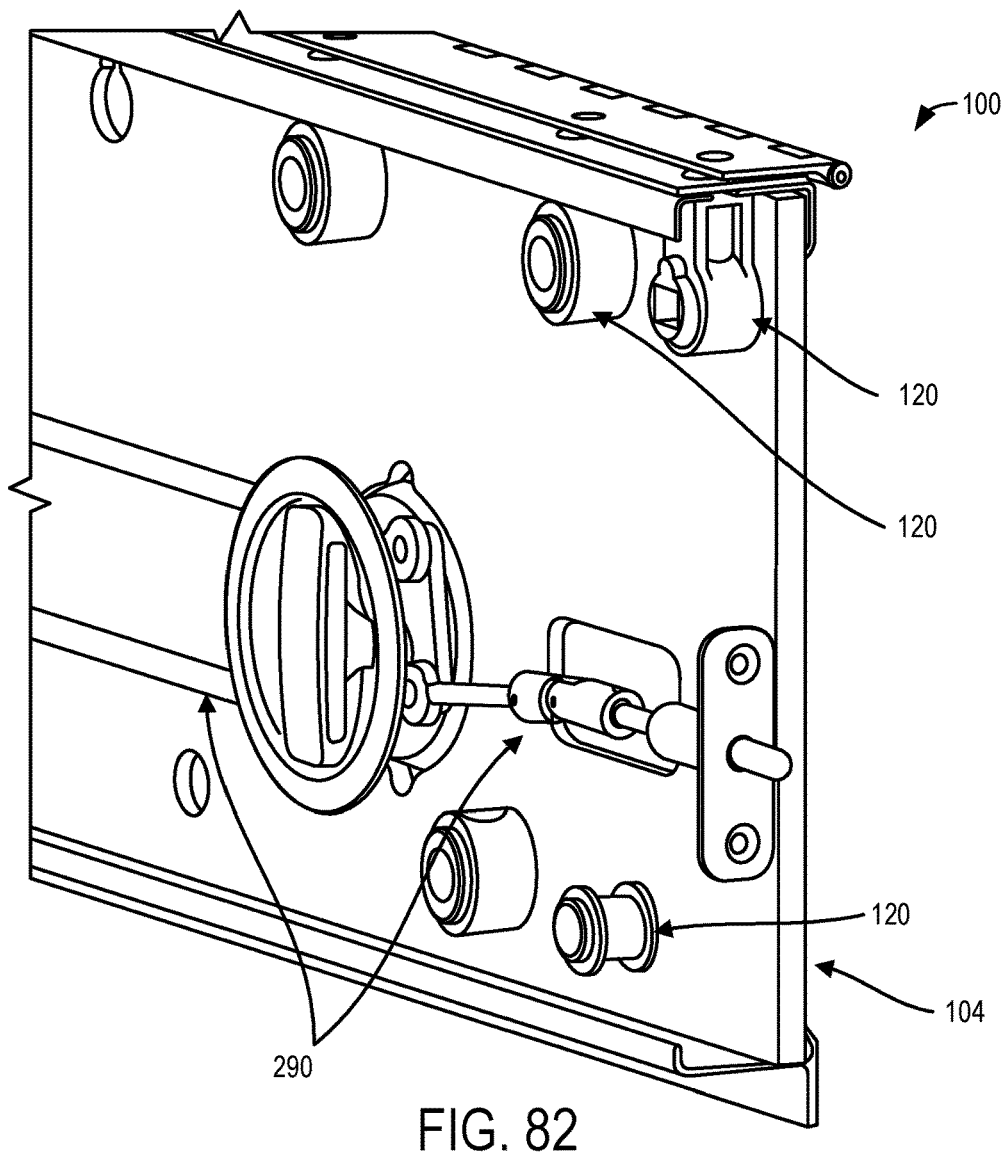
FIG. 82 illustrates an example perspective view of a folding window panel using the panel apparatus, according to an example embodiment.

FIG. 82 illustrates an example perspective view of a folding window panel using the panel apparatus 100 as described herein. Only the second sandwich panel 104 is shown, and includes multiple variations of the mechanical fastener 120, such as an edge insert and panel spacer, for example. A rotary latch 290 may be used to open and close the panel. The example in FIG. 82 includes a panel that is hinged, and is referred to as a folding window panel because when opened, the panel creates a viewing window from an area of the airplane to another area by a flight attendant, for example. The rotary latch 290 keeps the panel closed. This type of panel may also be used for a hinged door with a latch. An advantage using the double panel construction is that channels and or cavities between panels are created for insertion of items such as the rotary latch 290, and edge inserts can be accommodated.

Figure 83:
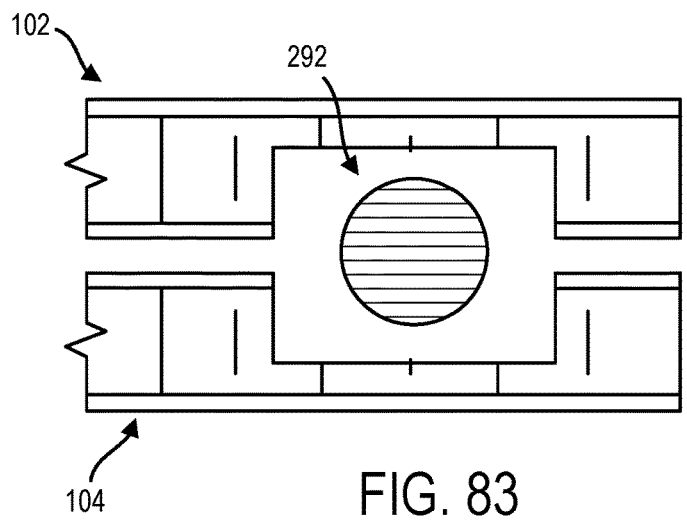
FIG. 83 illustrates a side view of an example of a channel provided between the first sandwich panel and the second sandwich panel, according to an example embodiment.

FIG. 83 illustrates a side view of an example of a channel 292 provided between the first sandwich panel 102 and the second sandwich panel 104 lengthwise along the first sandwich panel 102 and the second sandwich panel 104. In this example, the channel 292 can be routed into the panel apparatus 100 to provide space for the mechanical fastener 120, or space for wires, or a rotary latch, etc., and in some examples, the mechanical fastener 120 is mechanically embedded between the first sandwich panel 102 and the second sandwich panel 104 into the channel 292.

FIG. 84 shows a flowchart of an example method 300 of assembling the panel apparatus, according to an example embodiment. Method 300 shown in FIG. 84 presents an embodiment of a method that, for example, could be used to assemble the panel apparatus as shown and described herein, for example. It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 302, the method 300 includes arranging the first sandwich panel 102 and the second sandwich panel 104 substantially parallel to each other, and the first sandwich panel 102 and the second sandwich panel 104 each include the core material 106 and 112 inserted between at least two skin layers 108 and 110 of the first sandwich panel 102 and layers 114 and 116 of the second sandwich panel 104.

At block 304, the method 300 includes mechanically embedding the at least one mechanical fastener 120 into the first sandwich panel 102 and the second sandwich panel 104, and the at least one mechanical fastener at least extends through one skin layer and into the core material of the first sandwich panel and at least extends through one skin layer and into the core material of the second sandwich panel. The at least one mechanical fastener is configured to accept insertion of an item.

Within examples, holes can be cut into the first sandwich panel 102 and the second sandwich panel 104 as needed for the mechanical fastener 120 to be embedded as a passageway through one or both of the first sandwich panel 102 and the second sandwich panel 104, or indentations can be routed in one or both of the first sandwich panel 102 and the second sandwich panel 104 as needed for the mechanical fastener 120 to be embedded therein. As described and shown in various Figures above, the mechanical fastener 120 can be embedded into only the first sandwich panel 102, only the second sandwich panel 104, between the first sandwich panel 102 and the second sandwich panel 104, through the first sandwich panel 102 and into the second sandwich panel 104, and/or fully through both of the first sandwich panel 102 and the second sandwich panel 104.

Using the method 300, for example, a double panel construction is described that enables installing mechanical fasteners that are retained between the two panels, and can be immediately used. Because no potting compounds are required for installation of the mechanical fastener (due to the mechanical fasteners being held in place by each of the first sandwich panel 102 and the second sandwich panel 104), there is no need to wait for any adhesive compound to cure prior to use of the mechanical fasteners. In addition, using the panel apparatus described herein and the method 300 for assembly the apparatus allows for manufacturing efficiencies due to less downtime spent allowing the potting compounds to cure.

FIG. 85 shows a flowchart of an example method for use with the method 300 shown in FIG. 84. At block 306, FIG. 85 includes attaching the panel trim 210 to an exterior perimeter of the panel apparatus (e.g., as shown in FIGS. 64-66).

FIG. 86 shows a flowchart of another example method for use with the method 300 shown in FIG. 84. At block 308, FIG. 86 includes installing the at least one mechanical fastener 120 between the first sandwich panel 102 and the second sandwich panel 104. The installation may occur, for example, using a mechanical fitting between the first sandwich panel 102 and the second sandwich panel 104, such as snapping into place, with or without use of an adhesive.

FIG. 87 shows a flowchart of another example method for use with the method 300 shown in FIG. 84. At block 310, FIG. 87 includes inserting the item (e.g., fastener component 266) into the at least one mechanical fastener 120 and continuing manufacturing of the panel apparatus at substantially ambient temperature. In this example, the item can be inserted without waiting for duration of a cure cycle following installation of the at least one mechanical fastener 120, and the cure cycle would occur at a temperature elevated as compared to ambient temperature.

FIG. 88 shows a flowchart of another example method for use with the method 300 shown in FIG. 84. At block 312, FIG. 88 includes inserting one or more pins 128 into the gap 118 between the first sandwich panel 102 and the second sandwich panel 104. The one or more pins 128 extend through the bottom skin layer 110 of the two skin layers of the first sandwich panel 102 and into the core material 106 of the first sandwich panel 102 and also extend through the top skin layer 114 of the two skin layers of the second sandwich panel 104 and into the core material 112 of the second sandwich panel 104. The first sandwich panel 102 and the second sandwich panel 104 are arranged such that the bottom skin layer 110 of the first sandwich panel 102 faces the top skin layer 114 of the second sandwich panel 104.

FIG. 89 shows a flowchart of another example method for use with the method 300 shown in FIG. 84. At block 314, FIG. 89 includes positioning the third panel 260 perpendicular to the first sandwich panel 102 and the second sandwich panel 104. At block 316, FIG. 89 includes inserting the fastener component 266 through the third panel 260 and into one of the paired inserts 250 and 252 of the panel joint to secure the third panel 260 to the first sandwich panel 102 and the second sandwich panel 104.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A panel apparatus, comprising:
   a first sandwich panel and a second sandwich panel arranged substantially parallel to each other, wherein the first sandwich panel and the second sandwich panel each include a core material inserted between at least two skin layers, wherein the first sandwich panel and the second sandwich panel include honeycomb sandwich panels; and
   at least one mechanical fastener mechanically embedded into the first sandwich panel and the second sandwich panel, wherein the at least one mechanical fastener at least extends through one skin layer and into the core material of the first sandwich panel and at least extends through one skin layer and into the core material of the second sandwich panel, and wherein the at least one mechanical fastener is configured to accept insertion of an item.

2. The panel apparatus of claim 1, wherein the at least one mechanical fastener is mechanically secured between the first sandwich panel and the second sandwich panel.

3. The panel apparatus of claim 1, wherein the at least one mechanical fastener secures the first sandwich panel and the second sandwich panel to each other such that a gap remains between the first sandwich panel and the second sandwich panel.

4. The panel apparatus of claim 3, further comprising one or more pins inserted into the gap between the first sandwich panel and the second sandwich panel, wherein the one or more pins extend through a bottom skin layer of the two skin layers of the first sandwich panel and into the core material of the first sandwich panel and also extend through a top skin layer of the two skin layers of the second sandwich panel and into the core material of the second sandwich panel, wherein the first sandwich panel and the second sandwich panel are arranged such that the bottom skin layer of the first sandwich panel faces the top skin layer of the second sandwich panel.

5. The panel apparatus of claim 1, wherein the at least one mechanical fastener extends through the first sandwich panel and at least extends through one skin layer and into the core material of the second sandwich panel.

6. The panel apparatus of claim 1, wherein the at least one mechanical fastener extends through the first sandwich panel and through the second sandwich panel.

7. The panel apparatus of claim 1, wherein the at least one mechanical fastener includes a top portion mechanically embedded into the first sandwich panel, a bottom portion mechanically embedded into the second sandwich panel, and a flange around a perimeter of the at least one mechanical fastener between the top portion and the bottom portion, wherein the flange inserts between a bottom skin layer of the first sandwich panel and a top skin layer of the second sandwich panel, wherein the first sandwich panel and the second sandwich panel are arranged such that the bottom skin layer of the first sandwich panel faces the top skin layer of the second sandwich panel.

8. The panel apparatus of claim 1, wherein the at least one mechanical fastener includes engagement features to maintain spacing between the first sandwich panel and the second sandwich panel and to maintain the at least one mechanical fastener within each of the first sandwich panel and the second sandwich panel, wherein the engagement features are protrusions on a portion of the at least one mechanical fastener that extends into the core material of the first sandwich panel and on a portion of the at least one mechanical fastener that extends into the core material of the second sandwich panel.

9. The panel apparatus of claim 1, wherein the at least one mechanical fastener includes paired inserts connected by an arm, wherein each insert of the paired inserts at least extends through the one skin layer and into the core material of the first sandwich panel and at least extends through the one skin layer and into the core material of the second sandwich panel, and wherein at least one of the inserts of the paired inserts is configured to accept insertion of the item.

10. The panel apparatus of claim 1, wherein the at least one mechanical fastener includes paired inserts connected by an arm, wherein a first insert of the paired inserts at least extends through the one skin layer and into the core material of the first sandwich panel and at least extends through the one skin layer and into the core material of the second sandwich panel, wherein a second insert of the paired inserts at least extends through the one skin layer and into the core material of the first sandwich panel, and wherein at least one of the inserts of the paired inserts is configured to accept insertion of the item.

11. The panel apparatus of claim 1, wherein the at least one mechanical fastener is mechanically embedded into the first sandwich panel and the second sandwich panel proximal to side edges of the first sandwich panel and the second sandwich panel, wherein the at least one mechanical fastener is configured to accept insertion of an item into a gap between the first sandwich panel and the second sandwich panel through the side edges.

12. The panel apparatus of claim 1, wherein the at least one mechanical fastener is mechanically embedded between the first sandwich panel and the second sandwich panel into a channel lengthwise along the first sandwich panel and the second sandwich panel.

13. The panel apparatus of claim 1, wherein the mechanical fastener comprises a panel spacer mechanically embedded into the first sandwich panel and the second sandwich panel, wherein the panel spacer extends through one skin layer and into the core material of the first sandwich panel and extends through one skin layer and into the core material of the second sandwich panel, and wherein the panel spacer maintains spacing between the first sandwich panel and the second sandwich panel and further transfers load across the first sandwich panel and the second sandwich panel.

14. The panel apparatus of claim 13, wherein the panel spacer includes a top portion mechanically embedded into the first sandwich panel, a bottom portion mechanically embedded into the second sandwich panel, and a flange between the top portion and the bottom portion, wherein the flange is position between the first sandwich panel and the second sandwich panel to maintain the spacing between the first sandwich panel and the second sandwich panel.

15. The panel apparatus of claim 1, wherein the at least one mechanical fastener includes a wiring mounting saddle with an extended base that is mechanically embedded into the first sandwich panel and the second sandwich panel.

16. The panel apparatus of claim 1, further comprising a panel trim further securing the first sandwich panel and the second sandwich panel to each other, wherein the panel trim attaches to side edges of the first sandwich panel and the second sandwich panel.

17. The panel apparatus of claim 16, wherein the panel trim includes a retention feature that extends into a gap between the first sandwich panel and the second sandwich panel through the side edges and engages with a slot on a skin layer of one of the first sandwich panel and the second sandwich panel.

18. The panel apparatus of claim 16, wherein the panel trim includes a slot feature that extends into a gap between the first sandwich panel and the second sandwich panel through the side edges and engages with a retention feature on a skin layer of one of the first sandwich panel and the second sandwich panel.

19. The panel apparatus of claim 1, wherein the at least one mechanical fastener includes paired features connected by an arm, wherein a first feature of the paired features at least extends through the one skin layer and into the core material of the first sandwich panel and at least extends through the one skin layer and into the core material of the second sandwich panel, wherein a second feature of the paired features at least extends through the one skin layer and into the core material of the second sandwich panel, and wherein the at least one mechanical fastener is mechanically embedded into the first sandwich panel and the second sandwich panel proximal to side edges of the first sandwich panel and the second sandwich panel, wherein the second feature is configured to accept insertion of an item into a gap between the first sandwich panel and the second sandwich panel through the side edges, and the panel apparatus further comprises:
 a panel trim further securing the first sandwich panel and the second sandwich panel to each other, wherein the panel trim attaches to side edges of the first sandwich panel and the second sandwich panel and also includes a retention feature that attaches to the second feature.

20. The panel apparatus of claim 1, wherein the at least one mechanical fastener includes paired inserts connected by an arm, wherein the paired inserts at least extend through the one skin layer and into the core material of the first sandwich panel and at least extend through the one skin layer and into the core material of the second sandwich panel, and the panel apparatus further comprises:
 a third panel positioned perpendicular to the first sandwich panel and the second sandwich panel; and
 a fastener component positioned through the third panel and into one of the paired inserts to form a panel joint to secure the third panel to the first sandwich panel and the second sandwich panel.

21. The panel apparatus of claim 1, further comprising one or more additional mechanical fasteners mechanically embedded into one of the first sandwich panel and the second sandwich panel, and configured to accept insertion of an item.

22. A method of assembling a panel apparatus, comprising:
 arranging a first sandwich panel and a second sandwich panel substantially parallel to each other, wherein the first sandwich panel and the second sandwich panel each include a core material inserted between at least two skin layers, wherein the first sandwich panel and the second sandwich panel include honeycomb sandwich panels; and
 mechanically embedding at least one mechanical fastener into the first sandwich panel and the second sandwich panel, wherein the at least one mechanical fastener at least extends through one skin layer and into the core material of the first sandwich panel and at least extends through one skin layer and into the core material of the second sandwich panel, and wherein the at least one mechanical fastener is configured to accept insertion of an item.

23. The method of claim 22, further comprising attaching a panel trim to an exterior perimeter of the panel apparatus.

24. The method of claim 22, further comprising installing the at least one mechanical fastener between the first sandwich panel and the second sandwich panel.

25. The method of claim 22, further comprising inserting the item into the at least one mechanical fastener and continuing manufacturing of the panel apparatus at substantially ambient temperature.

26. The method of claim 22, further comprising inserting one or more pins into a gap between the first sandwich panel and the second sandwich panel, wherein the one or more pins extend through a bottom skin layer of the two skin layers of the first sandwich panel and into the core material of the first sandwich panel and also extend through a top skin layer of the two skin layers of the second sandwich panel and into the core material of the second sandwich panel, wherein the first sandwich panel and the second sandwich panel are arranged such that the bottom skin layer of the first sandwich panel faces the top skin layer of the second sandwich panel.

27. The method of claim 22, wherein the at least one mechanical fastener includes paired inserts connected by an arm, wherein the paired inserts at least extend through the one skin layer and into the core material of the first sandwich panel and at least extend through the one skin layer and into the core material of the second sandwich panel, and the method further comprises:

positioning a third panel perpendicular to the first sandwich panel and the second sandwich panel; and inserting a fastener component through the third panel and into one of the paired inserts to form a panel joint to secure the third panel to the first sandwich panel and the second sandwich panel.

\* \* \* \* \*